(12) United States Patent
Bruce et al.

(10) Patent No.: US 6,800,361 B2
(45) Date of Patent: Oct. 5, 2004

(54) GYPSUM BOARD HAVING IMPROVED FLEXIBILITY, TOUGHNESS, ABUSE RESISTANCE, WATER RESISTANCE AND FIRE RESISTANCE

(75) Inventors: Robert B. Bruce, Burlington, CA (US); Ashok Harakhlal Shah, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/172,135

(22) Filed: Jun. 14, 2002

(65) Prior Publication Data

US 2003/0232182 A1 Dec. 18, 2003

(51) Int. Cl.[7] ............................................. B32B 13/02
(52) U.S. Cl. ................ 428/294.7; 428/703; 428/319.1; 428/182; 428/913; 428/309.9
(58) Field of Search ............................... 428/292.1, 703, 428/220, 312.4, 319.1, 182, 219, 913, 294.7, 70, 420, 482, 426, 309.9, 71

(56) References Cited

U.S. PATENT DOCUMENTS

| 4,057,443 A | 11/1977 | Stiling et al. |
| 4,810,569 A | 3/1989 | Lehnert et al. |
| 6,187,409 B1 | 2/2001 | Mathieu |
| 6,221,521 B1 | 4/2001 | Lynn et al. |

FOREIGN PATENT DOCUMENTS

| CA | 1 189 434 | 6/1985 |
| DE | 41 22 964 A | 1/1993 |
| GB | 1 561 232 A | 2/1980 |

Primary Examiner—Merrick Dixon

(57) ABSTRACT

The present invention relates to a gypsum board having a nonwoven liner and a gypsum core. The gypsum board of the present invention has a high work to break, resulting in a gypsum board product that has a high resistance to abuse in use. The gypsum board of the invention is also more flexible and more resistant to water and fire than paper-lined gypsum board, and does not contain nutrients that support mold growth.

48 Claims, 13 Drawing Sheets

GYPSUM BOARD HAVING IMPROVED FLEXIBILITY, TOUGHNESS, ABUSE RESISTANCE, WATER RESISTANCE AND FIRE RESISTANCE

FIELD OF THE INVENTION

The present invention relates to an improved gypsum-based substrate faced with a polymeric nonwoven sheet material, the gypsum-based substrate suited for use in construction materials such as wall panels, ceiling panels, floor underlayment and interior and exterior sheathing.

BACKGROUND OF THE INVENTION

Gypsum board is traditionally manufactured by a continuous process. In the process, a gypsum slurry is first generated in a mechanical mixer by mixing calcium sulfate hemihydrate (also known as calcined gypsum), water, and other agents. These various additives are used in the gypsum slurry as set accelerators (such as ground gypsum, potassium sulphate), set retarders (such as diethylene triamine tetra acetic acid), water reducing agents (such as condensed naphthalene sulphonates), foaming agents (such as lauryl alcohol ether sulphates), liner bonding agents (such as starch), anti-burning agents (such as boric acid), glass fibers for improved physical properties and fire resistance, other agents to improve reaction to fire properties (such as clay), water proofing agents (such as wax or silicones), or other agents. The gypsum slurry is deposited on a paper sheet which has had each edge scored or creased to facilitate the folding of the edges to make a sidewall of height equal to board thickness and a further flap of width about 1 inch wide folded back over the board. An upper continuously advancing paper sheet is then laid over the gypsum slurry and the edges of the upper and lower sheets are pasted to each other using glue at the edges of the top and/or bottom sheet. The paper sheets and gypsum slurry are passed between parallel upper and lower forming plates or rolls in order to generate an integrated and continuous flat strip of unset gypsum sandwiched between the paper sheets that are known as facing or liners. This strip is conveyed over a series of continuous moving belts and rollers for a period of 2 to 5 minutes during which time the core begins to hydrate back to gypsum and hardens. During each transfer between belts and/or rolls, the strip is stressed in a way that can cause the paper facing to delaminate from the gypsum core if the adhesion between the gypsum core and the facing is not sufficient. Once the gypsum core has set sufficiently, the continuous strip is cut into shorter lengths or even individual boards or panels of prescribed length. Once again, it is important for there to be good adhesion between the paper sheets and the set, but still wet, gypsum core or the cutting action will pull the edges of the paper facing sheet away from the gypsum core. Good adhesion between the top and bottom paper sheet at the edges which are pasted with glue is also important here.

After the cutting step, the gypsum boards are separated and grouped through a series of belts and rollers and then flipped over before being fed into drying ovens or kilns where the boards are dried so as to evaporate excess water. The hydration from hemihydrate to gypsum must be essentially complete by this point, normally between 7 and 15 minutes after mixing. When the gypsum boards are accelerated, flipped and fed into the drying ovens, the boards are subjected to a variety of stresses that can cause the facing to peel away from the gypsum core of the boards unless there is good adhesion between the set (but still wet) gypsum core and the facing material. Inside the drying ovens, the boards are blown with hot drying air at speeds up to 4000 feet/minute which can cause further delamination of the paper facing if there is not good wet adhesion between the gypsum and the paper liners. If portions of the facing sheets delaminate from the gypsum core during drying in the oven, the liner can become entangled in the rollers and the gypsum crumbles as it dries, jamming the oven, which then requires the line to be shut down while the loose gypsum and liner is cleaned out of the ovens. Poor wet bond between liner and the gypsum core can also result in blisters due to delamination during the drying process. The gypsum boards are dried in the ovens for anywhere from 30 to 75 minutes. After the dried gypsum boards are removed from the ovens, the ends of the boards are trimmed off and the boards are cut to desired sizes. Good adhesion between the top and bottom paper sheet at the edges which are pasted with glue is also important throughout the board forming process as well as during use of the board.

Gypsum board has been the subject of numerous patents, such as U.S. Pat. No. 4,057,443, Canadian Patent No. 1,189,434, as well as co-pending U.S. patent application Ser. Nos. 09/512,921 and 09/513,097, all of which are incorporated herein by reference.

For years it has been recognized that high toughness and abuse resistance are desirable properties in gypsum-based board for use in buildings. High toughness and abuse resistance are here defined in terms of high initial modulus, high flexural strength corresponding to high-to-moderate initial modulus, high maximum flexural strength and high work-to-break. In addition to high toughness, it is desirable for gypsum board to have an abrasion resistant property in order to resist abuse. Further, it is desired to have gypsum board with some flexibility under load.

Standard gypsum boards are produced with a cellulosic paper liner. Paper has good wet adhesion with the gypsum slurry during board formation. It is believed that cellulose draws moisture from the slurry and pulls the slurry into close contact with the paper fibers. As the gypsum sets, there is some interlocking of the gypsum crystals with the paper fibers at the surface of the liner, as well as some chemical bonding between the wet gypsum matrix and the hydrophilic paper fibers. Paper does not allow the gypsum slurry to seep through during board forming, provides reasonable strength and a paintable surface to the finished gypsum board.

However, there are several disadvantages to the use of paper as a liner for gypsum board. Paper acts as a food source for mold and mildew, and it becomes especially weak and subject to delamination either directly from the gypsum core or between the layers of the multi-layer sheets when the paper becomes damp due to water leaks or high humidity.

In addition, standard paper-lined gypsum board has lower work-to-break and abrasion resistance than is needed for certain applications. Work-to-break (WTB) is defined as the force (or stress) required to break the sample times the distance (or strain) that the sample is deformed before failure. On a stress- strain curve, WTB is represented by the area under this stress-strain or breaking curve.

In use, paper-faced gypsum boards are generally coated with another material, such as specialty paint or wall coverings, in order to achieve high abrasion resistance. To overcome these durability problems, paper-faced board is frequently covered with a wall paper of hard sheet or plastic film when used in high traffic areas.

There are international and foreign building materials standards that also classify conventional gypsum boards in the combustible category. There have been efforts to make panel products from gypsum that can achieve noncombustible status. The weight fraction of 5–6% paper in standard paper-lined gypsum would most likely cause this building material to fail the test for combustibility as described in ASTM E136, were it not for the fact that some building materials, such as gypsum board, have been defined in section X1.2.3b of the standard as noncombustible, based on their composition and flame spread properties alone. U.S. Pat. No. 6,221,521 concerning gypsum boards made without liners describes how even these gypsum/fiber boards that are reinforced with internal cellulosic fibers instead of external paper liners are deemed combustible as tested by ASTM E136 because of the presence of more than 3–4% of organic fibers in the core of the board.

A normal paper liner contains about 170–220 g/m$^2$ of cellulosic content. Similar standards exist in other countries and new European standards being implemented do not classify standard cellulosic paper-lined gypsum board as noncombustible, due to the calorific content of the surface liner.

As technology evolves regarding fire protection in buildings, consideration is being given to both building system fire resistance as well as a product's reaction to fire. It is desirable to have a gypsum board that contributes as little fuel load as possible in a fire situation to improve the overall fire risk in buildings. It is beneficial for the liners used to make gypsum board to have a low calorific content in order to reduce the fuel load brought about through its use in the building.

Commercially available gypsum board products with liners other than cellulosic paper have been developed, an example being Dens-Glass® Gold exterior sheathing (available from Georgia-Pacific, Inc., Atlanta, Ga.). Dens-Glass® Gold exterior sheathing uses a glass mat in place of cellulosic paper liner. However, this product has relatively low WTB and low deflection and hence, is brittle. In addition, the surface of the Dens-Glass® Gold exterior sheathing is very different from standard cellulosic paper-lined gypsum board for interior use. For use in interior walls, it is desired to have a gypsum board with a surface similar to standard paper-lined gypsum board so that it can be painted and have a similar appearance as standard paper-lined board.

It has been a notorious problem with the standard paper-lined gypsum board that the paper liner peels off while removing wall paper. The most common technique for removing the old wall paper is to perforate the old wall paper by scoring and then wetting the perforated wall paper with water to loosen up the glue underneath the wall paper, which results in moist paper liner and hence, the paper liner becomes very susceptible to peeling when the wall paper is removed.

There have been attempts to substitute stronger and more durable synthetic sheet materials for the paper liners found in conventional gypsum board products. Canadian Patent No. 1,189,434 discloses gypsum panels made with a facing of a moisture vapor permeable spunbonded nonwoven material. Canadian Patent No. 1,189,434 discloses gypsum panels faced with Tyvek® spunbonded olefin sheet material. Tyvek® is a registered trademark of E.I. du Pont de Nemours and Company of Wilmington, Del. Tyvek® sheets are made by solution flash-spinning polyethylene to form fine plexifilamentary fibril structures that can be thermally bonded to form sheet material. The product of Canadian patent number 1,189,434 has several shortcomings. The product has been found to have poor adhesive bonding between the liner material and the gypsum slurry during the board manufacturing process. In addition, although the Tyvek® liner is as strong as paper in the machine direction (MD) and almost three times as strong in the cross direction (CD), the board strength is about one-third that of paper-lined standard gypsum board in the MD of the liner. In addition, the surface of the gypsum board is shiny and almost film-like smooth, which are characteristics of the Tyvek® sheet surface. Also, the melting point of Tyvek® sheet is quite low at 135° C., and the sheet starts shrinking at temperatures close to 100° C. This is a disadvantage because the drying ovens used in conventional gypsum board-making processes operate at temperatures well above 100° C., usually above 150° C.

It is desired to have gypsum board which would not sag or significantly lose its flexural strength when wet or in a high humidity environment. In addition, it is also desired to have abrasion resistant gypsum board. It is also desired to have gypsum board with high peel strength between the liner and the core. It would also be desirable to have good release properties between the liner and an overlying covering.

It is also desired to have a gypsum board free of ingredients that would act as nutrients for mold growth. Conventional gypsum board contains organic matter which provides food for fungi such as mold and mildew.

It is an object of the present invention to provide a gypsum board which provides the following product attributes: flexibility, high toughness, high surface stability against abrasion and peeling, resistance to liquid water and high humidity, fire resistance, mold resistance and paper-like surface.

BRIEF SUMMARY OF THE INVENTION

In one embodiment, the present invention relates to a gypsum board comprising a gypsum core held between two sheets of porous, fibrous polymeric nonwoven liner, wherein the work-to-break of the gypsum board in the MD of the nonwoven liner at a strain of 0.75 inch is greater than 30 lb.-in.

In another embodiment, the invention also relates to a gypsum board having a work-to-break in the MD at a strain of 0.75 inch of greater than 60*X lb-in, where X is the thickness of the board in inches.

In another embodiment, the present invention is directed to a gypsum board comprising a gypsum core held between two sheets of porous, fibrous polymeric nonwoven liner, wherein the nonwoven liner has strip tensile in the machine direction of at least 35 lb./in., percent elongation at 1 lb. in the MD of less than 0.7%, percent elongation at 3 lb. in the MD of less than 1.5% and percent elongation-at-break in the MD of less than 100%, strip tensile in the CD of at least 12 lb./in., percent elongation at 1 lb. in the CD of less than 3.0%, percent elongation at 3 lb. in the CD of less than 7.0% and percent elongation-at-break in the CD of less than 300%.

In another embodiment, the present invention is directed to a gypsum board comprising a gypsum core held between two sheets of porous, fibrous polymeric nonwoven liner, wherein the nonwoven liner has strip tensile in the MD of at least 65 lb./in., percent elongation at 1 lb. in the MD of less than 0.5%, percent elongation at 3 lb. in the MD of less than 0.7% and percent elongation-at-break in the MD of less than 50%, strip tensile in the CD of at least 22 lb./in., percent elongation at 1 lb. in the CD of less than 1.5%, percent elongation at 3 lb. in the CD of less than 3.0% and percent elongation-at-break in the CD of less than 100%.

DETAILED DESCRIPTION OF THE INVENTION

Figure 1:
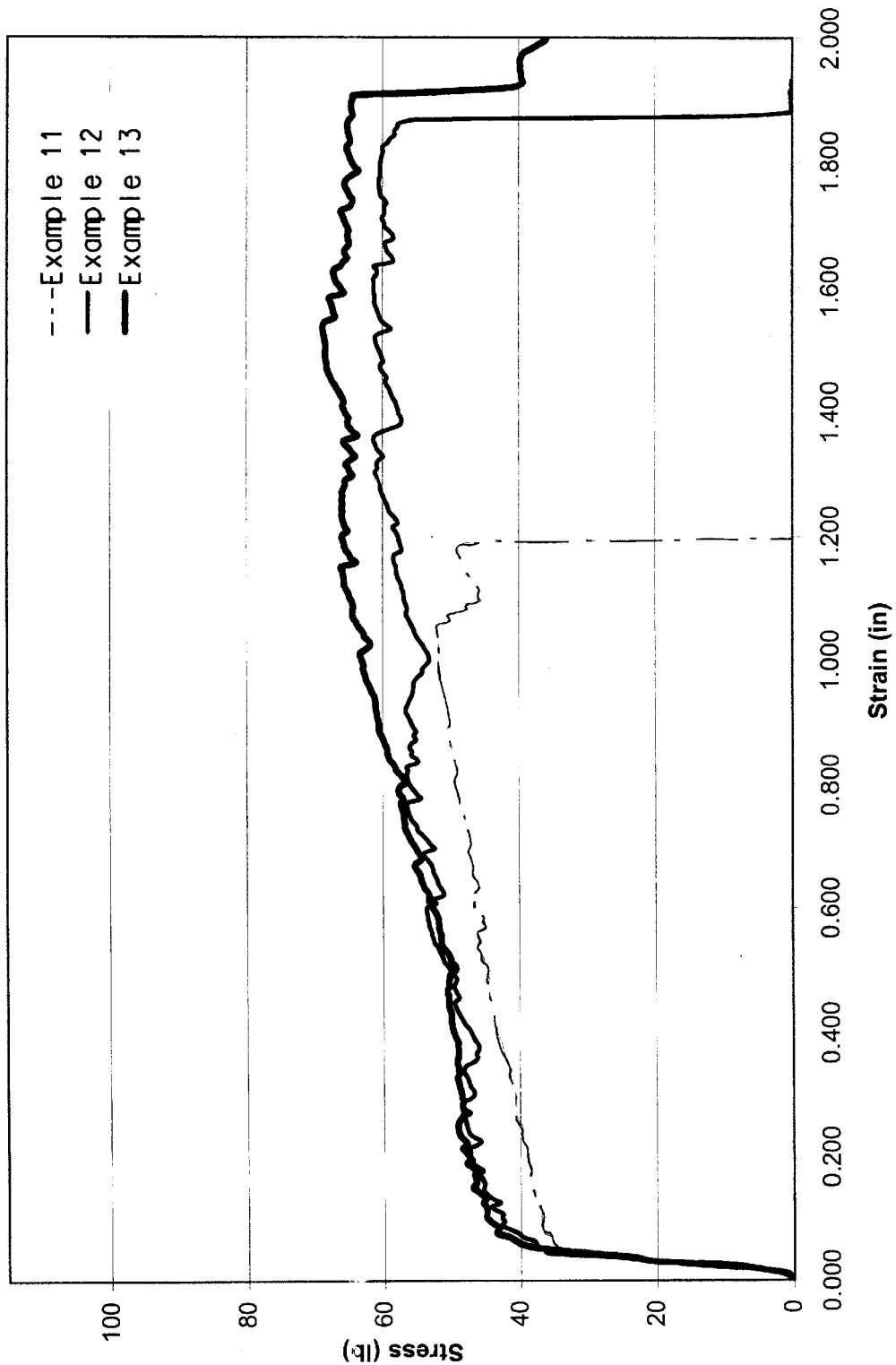
FIGS. 1–13 are stress-strain curves illustrating the deformation of various gypsum board samples (measured in distance units) as an increasing level of force is applied (measured in force units).

This invention describes a gypsum board product that is made by using special liners and a core formulated to take advantage of these liners. This board product has very unique and improved properties when compared to the conventional boards sold today: high work to break (WTB); good initial modulus, yield strength and peak load; and good resistance to abuse through abrasion, either before or after decoration of the surface, as compared to standard paper-lined board. In addition, due to the generally hydrophobic nature of the polymeric liners, the board is much more resistant to the deleterious effects of liquid water or water vapor when compared to conventional paper-lined gypsum boards. The high strength of the liners per unit weight also gives a product with good strength properties but much less fuel content and thus has improved fire resistance and reaction to fire properties. The enhanced product characteristics give a more flexible product that allows for easier installation in a wider range of building systems. The product can also be manufactured in such a way that the product will not support mold growth and allows the construction of mold resistant structures.

This invention also describes the process by which this product is made, in particular the use of a dense layer of gypsum next to the liner surface to promote good wet bonding and the use of additives that will promote good bonding of the liner to the gypsum core. It has also been found that it is possible to choose process additives that are suitable for board production but also will result in a product that is mold resistant. The invention can be implemented using a conventional gypsum board machine to make a wide range of superior products, with only minor changes to the equipment as required to accommodate the high performance properties of the novel liner and board. Furthermore, the invention uses a liner material that is dimensionally stable when exposed to water, making the manufacturing process easier to control.

Reference will now be made in detail to the presently preferred embodiments of the invention, examples of which are illustrated below.

In a first embodiment, the present invention is directed to a gypsum board product that has high WTB in addition to good initial modulus, yield strength and peak load. The gypsum board products of the present invention exhibit WTB in the MD of the nonwoven liners of greater than 30 lb.-in. at a strain of 0.75 in., and preferably greater than 40 lb.-in. at a strain of 1.0 in., even when the board has a thickness of only about ½ in. More preferably, the WTB in the MD of the gypsum board products of the present invention can be expressed by the equation:

$$WTB \geq 60 * X \text{ lb.-in.,}$$

wherein X is the thickness of the board in inches.

The WTB of the gypsum boards of the present invention in the CD of the nonwoven liners is greater than 10 lb.-in. at a strain of 0.75 in., preferably greater than 10 lb.-in. at a strain of 1.0 in.

The initial modulus of the inventive gypsum boards in the MD is at least 500 lb./in., with a peak load of at least 40 lb. The WTB at peak load is at least 30 lb.-in.

The gypsum boards of the present invention preferably will not break even when subjected to a bending strain of 0.5 in. at a bending stress of greater than 40 lb., or even at 1.0 in. strain and 45 lb. stress. The gypsum boards of the present invention have a loss in MD flexural strength of less than 75% when flexural strength peak load is measured immediately after holding the board under water for 2 hours as per ASTM C36. The gypsum board of the present invention has a ratio of the flexural strength peak load in the MD to the peak load in the CD less than 3.

The gypsum board of the invention includes a first nonwoven liner and a second nonwoven liner which envelope a gypsum core. The first and second nonwoven liners are porous, fibrous, polymeric nonwoven sheets which can be comprised of thermally and/or chemically bonded meltspun substantially continuous fibers, carded and/or air laid staple fibers webs, needle punched staple fiber webs, hydroentangled fibrous webs or other nonwoven structures. The nonwoven liners are made from fiber forming polymers derived from condensation- and/or addition-type monomers. Such polymers include polyethylene, polypropylene, aliphatic or aromatic polyamides or poly(ethylene terephthalate) (PET). Preferably, the nonwoven liners comprise a polymer having a softening or melting point of greater than 150° C. Such polymers include polypropylene which has a softening or melting point of 160° C. and PET which has a softening or melting point of 250° C. The reason for this is that the drying oven temperature is much higher than 100° C., and usually above 150° C. Liners made from sheets having a softening or melting point lower than 150° C. can melt, buckle or shrink during the drying step of the process.

The fibers that form the nonwoven liners for use in the present invention can contain additives such as dyes, pigments, UV and thermal stabilizers and antimicrobial agents.

Preferably, the nonwoven liners are a mixture of monocomponent fibers and bicomponent fibers that have been carded and/or air laid and hydroentangled into a nonwoven sheet and then bonded during drying and hot calendering. When sheath-core type bicomponent fibers are used in the nonwoven liner, the melting point of the sheath is sufficiently lower than that of the strength contributing fiber core and any monocomponent fibers to thermally bond the entire sheet structure. It is possible that the fibers providing thermal bonding can be low melting monocomponent fibers, although bicomponent fibers are preferred. When the nonwoven liners comprise a mixture of monocomponent and bicomponent fibers, the amount of bicomponent fibers is between about 10 wt. % and 50 wt. % of the weight of the liner fabric, preferably between about 15 wt. % and 35 wt. %.

Additionally, the liner should have the right level and right type of strength properties in order to produce novel gypsum board with specific strength properties. The nonwoven liners for use in the invention preferably have a strip tensile strength in the machine and cross directions similar to paper. In addition, the liners according to the present invention should have a low-to-moderate percent elongation-to-break under load.

The tensile strength of the liners contributes to the improved properties of the board of the present invention. The strip tensile strength is at least 35 lb./in., preferably above 65 lb./in., in the MD and at least 12 lb./in., preferably above 22 lb./in in the CD. By "machine direction" is meant the direction in which the nonwoven liners are produced (parallel to the direction of travel through the sheet-forming machine), and by "cross direction" is meant the direction perpendicular to the machine direction. The elongation-to-break, that is the percentage of deformation at the breaking point, of the nonwoven liners is at least less than 100%, preferably less than 50% in the MD and at least less than 300%, preferably less than 100% in the CD. The percent elongation of the liner at 1 lb. of force is at least less than 0.7%, preferably less than 0.5% in the MD and at least less than 3%, preferably less than 1.5% in the CD. The percent elongation of the liner at 3 lb. of force is at least less than 1.5%, preferably less than 0.7%, in the MD and at least less than 7.0%, preferably less than 3.0%, in the CD.

The nonwoven sheet of the liners has a stiffness which is high enough to allow the sheet to be folded and scored, like paper, for ease of replacing paper on existing gypsum board manufacturing machines. This is especially desired for the bottom liner on which the gypsum slurry is first deposited during the board forming process.

The liners should have sufficient porosity and bulk (defined herein as the thickness per unit basis weight*density) to allow some penetration of the wet gypsum slurry through the liners during board formation while still containing the gypsum slurry within its structure. A structure having very densely packed fibers will have very poor wet adhesion to the gypsum slurry, while too bulky and open liner structure can not have the desired strength per unit basis weight and can allow complete seepage of the wet gypsum slurry.

The nonwoven liners of the present invention are a porous sheet material in which the mean flow pore diameter is 5 to 100 micrometer range, preferably 10–70 micrometers. The mean flow pore pressure is at least less than 3 psi, preferably less than 1 psi. The liner has a specific level of body, that is, it comprises at least 20% voids by volume, preferably greater than 50% and its bulk is at least 1.25, preferably greater than 2.

According to one preferred embodiment of the invention, the first and second nonwoven liners each have a first surface characterized by pores or spaces formed between fibers, which pores are of sufficient size for a gypsum slurry to enter the pores and become intertwined with the fibers in the nonwoven liners so as to form a strong mechanical bond between the gypsum core and the liners when the gypsum sets up. The gypsum slurry which forms the gypsum core is deposited on the first porous surface of the first nonwoven liner, and the first porous surface of the second nonwoven liner is juxtaposed against the gypsum slurry such that when the gypsum slurry is enclosed between said first and second nonwoven liners, the slurry impregnates the pores or spaces between the fibers on the inner surfaces of the first and second nonwoven liners. The above-described combination of pore size, voids and bulk range allow the wet, set gypsum layer to intertwine with the fibers of the liner, providing good wet adhesion, without the gypsum slurry penetrating completely through the nonwoven liner to the other side.

The liners for use in the gypsum board of the invention must have good wet adhesion with the gypsum core. The wet adhesion between the liners and the core is partly determined by the structure and composition of the nonwoven sheet used as the liner material and partly by the composition of the gypsum core. The wet adhesion is particularly important for the production of the board since as a routine part of the conventional process for making board, after wet gypsum slurry is applied to the first nonwoven liner and the second nonwoven liner is applied to the opposite side of the slurry, the assembly of the liners and gypsum core is flipped. Good wet adhesion is critical to keep the assembly intact during this step of the board production process.

It is also important to have good dry adhesion between the liners and the gypsum core for translating liner strength to the finished gypsum board strength properties. In addition to mechanical interaction due to slurry penetration inside the liner structure, it is believed that chemical bonding between the liner and gypsum core also helps in improving the dry adhesion.

It is desired that the fibers at the surface of the liners coming in contact with the wet gypsum slurry be chosen to have sufficient micro-movement to allow for the swelling and then shrinking of the gypsum core that occurs during the setting and drying steps.

In addition, it is advantageous that the gypsum board product of the present invention has improved reaction to fire characteristics as measured by tests such as found in ASTM E136.

Depending on the application, the liner can have different types of surface; e.g., liner surface exposed to the interior of a room in an indoor application will have smoothness similar to paper based gypsum board while the liner surface exposed to gypsum core can be preferentially more rough for improving wet and dry adhesion.

When the gypsum board of the invention is intended for interior use, it is preferable for the appearance of the exposed surface of the nonwoven liners, i.e. the "outside surface", to be as similar as possible to that of paper liners commonly used in gypsum board. It is preferable for the nonwoven liners of the present invention to resemble the surface of common paper liners in order to provide a suitable appearance upon painting of the outer surface. Likewise, the outer surface of the nonwoven liners should be as similar as possible to common paper liners in order to facilitate application and removal of wall paper. To these ends, the surface of the nonwoven liners of the present invention should have a coefficient of friction of greater than 10 degrees, measured as described below.

In order to impart a similar degree of smoothness or roughness as paper to the nonwoven liner, the nonwoven liners can be hot calendered. Hot calendering also improves liner strength properties which results in improved gypsum board strength properties, specifically gypsum board modulus, delamination load (yield strength) and peak load with high WTB. Thermal bonding can be achieved by various other techniques in addition to, or instead of, hot calendering, examples being through-air bonding, infrared bonding and thermal bonding in a hot air convection oven. A binder fiber can also be used, comprising a low melting monocomponent and/or bicomponent fibers. The process can be combined with a chemical bonding process, such as resin bonding where the binder component (with crosslinking agents if needed) is applied to the liner bulk by various techniques, such as spray, foam, etc., followed by drying and/or curing steps. The binder can be in powder form and can be applied in dry form simply by spraying.

Preferably, the fibrous nonwoven sheet material for use in the liners has some fibers protruding from its surface on a microscopic level on at least one side thereof, which when the gypsum board is produced is the side in contact with the gypsum core. This can be accomplished by subjecting the fibrous nonwoven sheet to treatments such as hydroentangling, air jet entangling and needlepunching. Since a rough surface will enhance the interaction between the liner surface and gypsum in the wet and dry stages, it can be helpful to have the liner surface coming in contact with the gypsum slurry, i.e. the "inside surface", be rough.

It is also possible to bond the nonwoven liner to another sheet material combining the improved properties of the nonwoven liner with the additional properties of the added bonded layer. Examples of materials that could be used as multi-layers in this manner are other nonwoven liners, woven sheet, scrim, film, foil, etc. As discussed above, breathability of the liner is needed for drying of the gypsum core. It is possible that the breathability of the liner can be discrete (areas of liner with high, low or zero breathability). In addition, it is also possible that one side of the gypsum board can have low or no breathability.

It is to be noted that a fine embossed pattern on the liner surface does help in wet adhesion; however, the embossed pattern will create a surface other than a smooth paper-like surface. When the gypsum board is to be used in exterior applications, it can be desired to use a nonwoven liner that has been embossed with a pattern of channels large enough for water to drain under gravitational force.

The gypsum core is formulated to work with the properties of the nonwoven liners to provide the improved gypsum board of the invention. The nature of the chemical composition of the core has been found to enhance the dry bond strength between the core and the liners.

The major ingredients in the gypsum slurry formulation of the present invention are stucco (hemihydrate $CaSO_4$), accelerator like finely ground gypsum ($CaSO_4 \cdot 2H_2O$) and $K_2SO_4$, foaming agent added as a premixed foam, and a binder, preferably a non-starch-based binder, for example polyvinyl alcohol (PVA). It is preferred that the non-starch-based binder used is insoluble in water at room temperature and provides high dry bond strength between the liner and the core upon drying. Other non-starch-based binders, such as polyvinyl acetate can also be used. The formulation can also contain cross-linking agents for making the binder completely insoluble in water upon drying. The PVA is added as a solution to the core, but can be added in other ways, such as by adding a powdered PVA that dissolves during the setting and drying steps, or by spraying solution directly on the liner surface. Other additives, such as water reducing agents or anti-burning agents, often found in regular gypsum board can also be added as required to adjust the core formulation to the manufacturing process.

Wetting agents can also be used in the slurry or right on the liner surface to enhance wetting and penetration of the gypsum slurry between the individual fibers as much as possible. These wetting agents can include synthetic chemicals with hydrophilic and hydrophobic groups which are known to reduce surface tension of aqueous solutions and reduce contact angles with hydrophobic solids. A wide range of wetting agents will perform this function such as soaps and detergents, or foaming agents. A preferred wetting agent is polyvinyl alcohol (PVA).

It is also possible to add other ingredients to the slurry to improve the product performance or to optimize the process of manufacture. Examples of such ingredients are glass fibers and/or clay to improve fire resistance, boric acid to prevent calcination during drying, etc. If one of the requirements for the product is mold resistance, then additives such as dextrose, glue or starch that provide a food source for mold and other fungi should not be used.

In a preferred embodiment of the invention for some applications, such as for outdoor walls or indoor residential bathroom walls, the core contains a water-proofing agent, e.g., wax or silicone, in order to impart water resistance to the gypsum board. In yet another preferred embodiment for some applications, the core contains both water-proofing agents and agents to improve fire resistance, such as glass fibers or clay.

Preferably, the board of the invention has a higher density thin layer of gypsum with reduced air void percentage right underneath the liner to achieve the desired edge and surface hardness of the finished gypsum board. This can be achieved by a process known as "roller coating," described in U.S. Pat. No. 1,953,589 and U.S. Pat. No. 5,718,797, both of which are incorporated herein by reference, wherein gypsum slurry of higher density is first laid on the bottom liner and then the gypsum slurry of normal or lighter density is poured on top. The top liner is also coated with a thin layer of gypsum slurry of higher density. The result is a thin dense layer of gypsum of higher density immediately under the outside liners and along each edge so that the board has improved properties such as increased hardness.

One of the major benefits of the gypsum board products of this invention is that the novel board can be made on an existing board manufacturing line with only modest changes to the process formulation and equipment. The changes to the process formulation and equipment are the result of optimizing the product and process to take best advantage of the improved gypsum board liner and gypsum board product, as well as required changes to accommodate the much improved physical properties of the final gypsum board product.

TEST METHODS

Measuring the Characteristics of the Nonwoven Liner

The strip tensile properties of the liners were measured according to ASTM 5035 using a CRE (constant rate of extension) Instron Tensile Tester (available from Instron Corporation of Canton, Mass.). The sample size used was 1 inch by 8 inch; the gauge length was 5 inches, and the speed was 2 inches per minute. The properties measured were peak load (lb.), elongation-at-break (%), elongation at 1 lb. load (%) and elongation at 3 lb. load (%).

The pore data for the liners were obtained on a PMI machine with a top to bottom flow chamber (manufactured by Porous Materials, Inc. of Ithaca, N.Y.). A sample holder with a 2.5 cm diameter was used, with a 40 mesh supporting screen (wire diameter of 0.25 mm and screen opening of 0.375 mm) below the sample. The test fluid used was Silwick-20.1 dynes (available from PMI). The sample was prepared in the test fluid under a vacuum level of 23 mm Hg for 1 minute. Mean flow pore diameter (microns) and mean flow pore pressure (psi) were measured and reported.

Bulk (unitless) was calculated according to the following formula: Thickness (mils)/basis weight (oz/yd$^2$)×density (g/cm$^3$)×0.7493. The density of PET was assumed herein to be 1.38 g/cm$^3$; the density of the copoly(ethylene terephthalate) was assumed herein to be 1.35 g/cm$^3$; the density of linear low density polyethylene (LLDPE) was assumed herein to be between 0.91 to 0.95 g/cm$^3$; and the density of nylon 6,6 was assumed to be 1.3 g/cm$^3$.

Basis Weight (weight per unit area, oz/yd$^2$) was calculated by ASTM D3776.

Percent void (%) was calculated according to the following formula:

(1−1/Bulk)×100.

Coefficient of Friction (angle) was measured using Coefficient of Friction Tester, Model 32-35, manufactured by Testing Machines, Inc., New York. A 2"×2" size liner sample was placed on the stainless steel platform with a flat plate (weight 1256 g) on top. The platform was then gradually inclined until the liner/plate (weight) started sliding down the platform. The angle of inclination of the platform was recorded and was reported as a measure of surface smoothness (the lower the angle, the higher the smoothness).

Method for Preparing the Gypsum Board for Measuring the Breaking Characteristics Gypsum board using a specific gypsum slurry formulation and specific liner was prepared as described below. There were two types of board making procedures used: (1) roller coating the bottom liner, and (2) board made without roller coating the bottom liner. In both cases two pieces of liner of length 14 in. and width 10 in. were secured in a mold at one end, the two pieces being held apart by a spacer of thickness ½ in. The mold was made such that the open end of the mold was 1 in. higher than the closed end of the mold, this helping to keep the slurry from running out the open end of the mold. The top of the mold was open initially allowing the top liner to be folded in place once the slurry was poured on the bottom liner. The edges were of height ½ in. such that when the slurry was poured on the bottom liner, the slurry spread and the top liner put in place, a sample of width of 10 in., thickness of ½ in. and length of about 12 in. was prepared. The procedure for board-making for each type is as follows:

If the bottom liner was to be roller-coated, the stucco/accelerator blend was sifted into water in a Cuisinart Model CB-4J blender (made by Cuisinart, E. Windsor, N.J.) over 30 seconds, and the mixture was mixed on high speed for 7 seconds. At this point 50–75 ml of the mixture was quickly poured along one end of the mold on the back face of the bottom liner and a 10 in. wide trowel was used to spread the mix over the surface of the liner. Four passes of the trowel were made, giving good coverage with a coating depth of less than 1 mm and with some excess slurry pulled into the top end of the mold not used for the final sample. Separately, a foam solution was prepared by diluting Cedepal® FA406 (available from Stepan Chemicals) foaming agent with water to give a 0.5% solution by weight of foam concentrate. The required amount of diluted foam solution was placed in the cup of a Hamilton Beach Model 65250 mixer and the mixer run at high speed to prepare the foam solution. For the standard mix, two mixers were used, with 75 ml of diluted foam solution in each mixer for a total of 150 ml of diluted foam solution. In some cases the mix formulation required a different amount of foam solution, this being described in the description of each example. The foam mixers were started before the preparation of the stucco slurry and timed such that the foam would be mixed for about 1 minute before being used to prepare the board sample. At the required time, the foam was poured from the cups into the blender containing the gypsum slurry. Once the foam solution was added to the remainder of the stucco/water mix, the overall stucco/water/foam solution was mixed for a further 7 seconds on high speed once again. The foamed mix was then poured on top of the coated liner in the mold. The slurry was struck off with a straight edge held about 1 mm above the top of the mold, the top liner folded into place and then the liner pressed into place with two passes of a second straight edge. The overall mold was tilted at a slight angle to prevent the slurry from pouring from the mold in the event the slurry was particularly fluid.

If the bottom liner was not roller-coated, the stucco/accelerator blend was sifted into the water in a Cuisinart Model CB-4J blender over 30 seconds, and the mixture was mixed on slow speed for 4 seconds. The foam solution that had been mixing was then added to the remainder of the stucco/water mix and the overall stucco/water/foam solution was mixed for a further 10 seconds on high speed once again. The foamed mixture was then poured on top of the bottom liner in the mold. The slurry was struck off with a straight edge held about 1 mm above the top of the mold, the top liner folded into place and then the liner pressed into place with two passes of a second straight edge. The overall mold was tilted at a slight angle to prevent the slurry from pouring from the mold in the event the slurry was particularly fluid.

After allowing the gypsum slurry to hydrate (about 20 minutes) the sample was carefully removed from the mold. The sample was trimmed to 8 inches by 10 inches, with the 8-inch dimension being in the MD or 14-inch liner dimension of the mold.

The remaining 8 inch by 9 inch sample was then dried as follows: Normal drying process: The exposed core of the remaining 8 inch by 9 inch sample was covered by wrapping the edges with two thicknesses of 1 inch wide cotton adhesive tape. The sample was then dried in a convection oven at 475° F. until half of the free water was removed, and then the oven was reset to 225° F. until only 5–10 percent of the free moisture remained in the sample. After 90–95% of the free water was removed, the temperature was again reduced to 105° F. to finish drying the sample. Each sample was dried individually through the first two drying steps to ensure that the sample was dried in a consistent manner but was not over-dried.

Low Temperature Drying Process (for Low Melting Point Liners)

The exposed core of the remaining 8 inch by 9 inch sample was covered by wrapping the edges with two thicknesses of 1 inch wide cotton adhesive tape. The sample was then dried in a convection oven at 225° F. until half of the free water was removed, and then the oven was reset to 105° F. to finish drying the sample. Each sample was dried individually through the first drying step to ensure that the sample was dried in a consistent manner but was not over-dried.

After allowing the gypsum slurry to dry, a 1 inch strip of the board was carefully cut from the 8 inch by 9 inch sample leaving a 8 inch square sample.

The 1 inch wide sample was carefully cut from one edge of this sample for testing of dry bond. The sample was cut into half, with two pieces four inches by 1 inch in size.

The 8 inch square sample was cut in half to make two 4 inch by 8 inch samples for testing breaking strength as described below. It was possible to cut the sample either in the MD or the CD with reference to the sample preparation, but in all cases the sample was cut such that the long dimension of the sample was the MD of the sample preparation process.

Measuring the Breaking Characteristics of the Gypsum Board

The gypsum board samples were 8 inches long and 4 inches wide and were broken over a 7 inch span on a Shimpo Model FGS-250PVM programmable motorized test stand (manufactured by Nidec-Shimpo America Corporation, Itasca, Ill.). A 50 lb. force gauge (resolution 0.01 lb., accuracy 0.02% plus ½ digit at 73° F.) was used for bonding tests and a 500 lb. force gauge (resolution 0.1 lb., accuracy 0.02% plus ½ digit at 73° F.) was used for the breaking test measurements. The crosshead speed was 1.9 inches per minute with measurements taken every 0.2 seconds. Force in pounds vs. time in seconds was recorded at this constant crosshead speed to generate the stress-strain curve, also referred to as the breaking curve. The measurements were performed twice and the best value of the two breaking curves (force or load in pounds vs. deflection in inches) were reported as follows:

Initial Modulus (lb./in) was calculated as the initial slope of the force vs. deflection curve.

Delamination load or yield strength (lb.) was calculated as the force corresponding to a significant decrease in the initial slope of the breaking curve.

Strain (inches) is the deflection of the board as calculated by time multiplied by the speed of the crosshead as described above.

Peak Load (lb.) is the maximum force recorded during the breaking of the board.

Work-to-break (WTB) (lb.-in) is calculated as the area under the breaking curve up to a given deflection.

The dry bond between the liner and the gypsum core was measured by pulling a 1 inch wide by 1 inch long strip of the liner from the gypsum board at 90 degrees. The Shimpo Model FGS-250PVM programmable motorized test stand was used for this measurement. The crosshead speed was 1.9 inches per minute with measurements taken every 0.2 seconds. Force in pounds vs. time in seconds was recorded at this constant crosshead speed with an average bonding strength being determined by averaging the force measurements taken in pulling a 1 inch length of liner from the core. The measurements were performed twice and the best average of the two curves (force or bond strength in pounds vs. distance in inches) was reported.

The wet adhesion strength between the liner and wet gypsum slurry during board forming was assessed as follows. Gypsum slurry of desired formulation was first prepared by mixing all ingredients in a Waring Blender for 10 seconds. The gypsum slurry was then poured in a 0.5" tall mold with the liner at the bottom. The wet adhesion, or the adhesive bond, between the liner and the wet slurry was assessed by pulling the liner away from the core 20 minutes after mixing. The wet adhesion was graded as follows:

Very Good—The liner is intimately adhered to the gypsum core.

Good—The liner is adhered well to the gypsum core.

Good/OK—The liner peels off with some effort.

OK/Poor—The liner peels off with ease.

Poor—The liner peels off without any effort.

Surface abrasion resistance of the gypsum board was assessed by measuring surface abrasion resistance of the liner involved in making the gypsum board. A TABER® Abrasion Meter 5150, manufactured by TABER Industries, North Tonawanda, N.Y., was used for surface abrasion resistance measurement. TABER® CS-10 wheels were used with a weight of 500 grams. Loss in weight and thickness of the liners were reported after 500 revolutions. Lower loss in weight and lower reduction in liner thickness are the indicators of superior abrasion resistance.

The peel strength of the gypsum board was determined by peeling away tape that had been stuck to the surface. The test was performed by applying a piece of tape (6 cm×15 cm) to the surface of the gypsum board and pressing it firmly to ensure that the tape was adhered well. The tape was then pulled away from the board surface at a 90 degree angle. The test was performed on the surface of the gypsum board in both the machine and CDs of the exposed liner. Two types of tape were used, a construction tape with very strong adhesive (Tuck Tape construction tape from Canadian Technical Tape Limited, Montreal Canada) and a masking tape with much less bonding strength (Tartan General Purpose Masking Tape available from 3M Do-it-yourself Division, London, Ontario, Canada). The test was performed on boards at normal room conditions (70° F., 35–40% relative humidity (RH)) as well as at high humidity (16 hrs at 90% RH by $ZnSO_4.7H_2O$ saturated solution with air circulation at 70° F.). The tests were performed with the boards uncoated as well as painted with a water based primer and paint (Glidden Maximum Hide Interior PVA Latex Primer 48180 White and Glidden Maximum Hide Interior Latex Flat 48100 White tinted to off-white). An estimate was made of the extent to which the surface of the board was damages when the tape was removed.

In all cases, the preparation and testing of the gypsum board samples was conducted to simulate the physical conditions of gypsum board made on a commercial production line, at critical junctures during the production process.

EXAMPLES

The following examples are listed in an order to demonstrate the following: (1) the importance of having the liner with specific porosity (mean flow pore diameter and mean flow pore pressure), bulk and percent void for good wet adhesion with the wet gypsum slurry during the initial setting period, (2) the importance of a liner with specific strength for producing the gypsum board of the invention with desired properties, (3) the importance of core formulation for enhancing strength properties of the gypsum board, and (4) the combination of liner and core for producing the gypsum board.

The gypsum board strength properties are compared with standard paper-lined gypsum board from BPB Westroc (subsidiary of BPB plc, UK), commercially available glass fiber-lined Dens-Glass® Gold exterior sheathing from GP Gypsum (subsidiary of Georgia Pacific Corp., Atlanta, Ga.), fire resistant gypsum board (generally known as "Type X") from BPB Westroc (subsidiary of BPB plc, U.K.) and abuse resistant/fire resistant gypsum board from CGC (a subsidiary of USG Corp., Chicago, Ill.). Improvement over prior art is also illustrated by comparing novel gypsum board per this invention with board made with flash-spun spun-bonded polyolefin product Tyvek® (available from E. I. du Pont de Nemours and Company, Wilmington, Del.) per the board making procedure given in Canadian Patent No. 1,189,434.

Examples are also included to demonstrate the improved performance of the novel boards when exposed to liquid water or high humidity, and the improved resistance to surface damage when compared to regular board.

Unless otherwise indicated, all the strength properties reported in following examples are for the MD of the board and liners.

Examples 1–10

Wet Adhesion of the Liner to the Gypsum Slurry

For Examples 1–10, gypsum slurry was first prepared by mixing the following ingredients in the Waring Blender for 10 seconds (600 g stucco $CaSO_4.1/2H_2O$, 1 g fine gypsum $CaSO_4.2H_2O$, 130 g of 4% Elvanol® 71-30, 500 g of water). The gypsum slurry was then poured in the 0.5" tall mold with the liner at the bottom. The wet adhesion, or the adhesive bond, between the liner and the wet slurry was assessed by pulling the liner away from the core 20 minutes after mixing as described in the Test Methods.

Observed wet adhesion and liner characteristics for the following Examples 1–10 are given in Table 1. Strength properties of liners discussed in the following Examples 1–10 are given in Table 2.

Example 1

Wet laid resin bond synthetic staple fibers based material, Ahlstrom 3701 (available from Ahlstrom Fiber Composites, Windsor Locks, Conn.), was tested for wet adhesion. As shown in Table 1, the wet laid liner gave very poor wet adhesion to gypsum slurry, most likely due to its tight sheet structure (low mean flow pore diameter and high mean flow pore pressure) and low bulk which prevented gypsum slurry from penetrating the liner interior and mechanically anchoring with the fibers. It is also hypothesized that the wet-lay process predominantly arranges fibers in a two dimensional planar area which generates a smooth surface with few points at which wet gypsum slurry can mechanically anchor.

Examples 2–3

Nonwoven liner materials based on melt spun nylon continuous fibers, available under the commercial names Cerex® 3030 PBN-II and 23280 (available from Cerex Advanced Fabrics,. LP, Pensacola, Fla.), were tested for wet adhesion. Cerex® 3030 PBN-II was a point bonded nonwoven sheet with high bulk (Table 1). Cerex® 23280 was smooth and thin and had a bulk level half that of 3030 PBN-II (Table 1). In addition, Cerex® 23280 had more closed structure than 3030 PBN-II (much higher mean flow pore pressure and much lower mean flow pore diameter as shown in Table 1). The board made using the Cerex® 3030 PBN-II liner (Example 2) gave good wet adhesion without any slurry bleed through as compared to the board made using the Cerex® 23280 liner (Example 3) which had poor wet adhesion. This illustrates the importance of the liner bulkiness and level of liner openness for good wet adhesion without slurry seepage.

Examples 4–7

Nonwoven sheet materials based on continuous melt spun bicomponent fibers having a sheath of LLDPE and a core of PET, made according to U.S. Pat. No. 5,885,909, were subjected to hot calender bonding (at 145° C., 1000 psi nip pressure). The sheet materials were used as the liners in gypsum boards and tested for wet adhesion. The LLDPE:PET ratio was varied at 10:90, 30:70 and 50:50 in Examples 4, 5 and 6, respectively. It was found that wet adhesion between the nonwoven liners and the gypsum core reduced significantly as the LLDPE content was increased. Wet adhesion at 10% LLDPE was marginal ("OK/Poor" rating), while at 30% and 50% LLDPE it was poor despite a high level of bulk and large pore size. It is hypothesized that when the bicomponent fiber nonwoven sheets used as liners are bonded completely, the degree of freedom of the fibers near the surface to move is reduced significantly which then results in low wet adhesion of the gypsum slurry to the nonwoven liners.

In order to improve wet adhesion, the sheet must have a more open structure which leads to the increased probability for the gypsum slurry to seep through the liner to the side in contact with the supporting belt during board formation. This was demonstrated in Example 7 in which a resin bonded nonwoven liner made from PET staple fibers had very good wet adhesion due to its open structure and high bulk. However, an unacceptable level of gypsum slurry seeped through the liner to the other side in contact with the support belt in the gypsum board forming process. The resin bond liner used in this example was made by carding PET staple fibers, saturating the liner with resin binder emulsion, drying and curing processing steps in sequence.

Example 8

Nonwoven sheet based on air-laid hydroentangled PET staple fibers, commercially available under the trade name Sontara® 8007 (available from E. I. du Pont de Nemours and Company, Wilmington, Del.), was evaluated for use as the nonwoven liner in the present invention. These nonwoven liners gave good wet adhesion to gypsum slurry; however, the surface stability of the liners was poor. In addition, as shown in Table 2, this liner had very high elongation under low load, specifically in the CD, which would result in low cross-directional initial modulus in the gypsum board. Sontara® was also soft and drapable which would make the scoring and edge folding difficult during the board forming process.

Examples 9–10

Nonwoven sheet liner materials based on a mixture of standard and bicomponent PET fibers, provided by Polymer Group, Inc. (PGI) of North Charleston, South Carolina, were evaluated for use in the invention. The nonwoven sheet material contained 15% by weight bicomponent fibers having a low melting PET sheath (melting point of 180° C.) with a high melting point PET core (melting point of 250° C.), with a remainder of standard (monocomponent) PET fibers. The denier of bicomponent fibers was 3 and that of standard PET fibers was 1.2. The fiber mixture was first carded and air-laid. The carded/air laid web was then hydroentangled and dried.

In Example 9, PGI liner material A2-064B (standard) was hot calendered at moderate nip pressure and at temperatures 190° C. and up to produce a well-bonded liner with a paper-like smooth surface and desired bulk level. The liner had desired pore size, bulk above 2.5, and gave very good wet adhesion without any slurry seepage. As shown in Table 2, Example 9 had desired strip tensile strength per unit basis weight in the MD and had low elongation under low load in both machine and CD. Table 2 also shows strip tensile for the base substrate A2-064B (designated as A2-064B (standard) and calendered A2-064B). For the liner in Example 9A (Table 1), the calendering temperature was at 202° C. instead 190° C. as in Example 9. The nip pressure was 100 lb./in., as in Example 9. The higher calendering temperature resulted in lower sheet thickness and a denser sheet (lower bulk and void fraction). Wet adhesion for liner of Example 9A was "OK/poor" as compared to "Good" for Example 9 as shown in Table 1. This illustrates the importance of the right level of hot calendering for maintaining the wet adhesion to the desired level.

PGI liner material A2-070A had a slightly higher basis weight than A2-064B and had more fibers in the CD and hence, had desired strip tensile strength per unit basis weight in both the MD and CD. The objective was to match the MD and CD strip tensile strength with paper used in standard gypsum board at almost half the basis weight, as compared to paper, in order to reduce the calorific content of the liner.

In Example 10, the PGI liner material A2-070A was hot calendered at a relatively high temperature and the same nip pressure of 100 lb./in. as compared to Example 9. This produced a well-bonded liner with a paper-like smooth surface and relatively less bulk level as compared to Example 9. However, the bulk was relatively less than Example 9 and contributed to low wet adhesion ("OK/poor" rating) as shown in Table 1.

As shown in Table 2, MD strip tensile of liner in Example 9 is very close to paper used in making standard gypsum board at almost half the basis weight of paper. As explained above, the liner in Example 10 has more fibers in the CD and slightly higher basis weight as compared to the liner in Example 9. Having all other processing steps the same, the liner in Example 10 has both MD and CD strip tensile strengths close to that of paper used in making standard gypsum boards. Also, note the low elongation at low loads such as, 1 and 3 pounds, for these liners in Examples 9 and 10.

It is believed that the liner made with a moderate level of bicomponent fibers which have been hydroentangled is not only strong, but has a surface with fine level micro-mobility and fine level of roughness due to a three-dimensional fiber distribution rather than two dimensional, planar distribution. The three-dimensional fiber distribution also helps in achieving the desired level of sheet bonding in hot calendering while maintaining the bulk at a sufficient level for good wet adhesion.

The role of the hydroentanglement process can be evidenced by comparing the wet adhesion of a gypsum board made with the liner of Example 9 with that of a board made with Cerex® 23280 in Example 3 in Table 1. Although Cerex® 23280 has significantly larger pore openings and similar bulk, the wet adhesion for Cerex® 23280 is poor while the wet adhesion for board made with the liner of Example 9 is good. In addition, when the liner is made from hydroentangled fibers, the above described microscopic level surface roughness results in a paper-like rather than a smooth plastic film-like surface after hot calendering.

As explained above, a moderate level of bicomponent fibers (15–35%) provided good strip tensile strength of the liner while at the same time retaining some unbonded microscopic areas at the liner surface. It is believed that these microscopic unbonded fiber areas enhance wet adhesion of the gypsum slurry similar to cellulosic paper as explained above. Excessive use of bicomponent fibers (exceeding 50%) would not only reduce wet adhesion, but would increase cost as well.

Air laid hydroentangled liners with fiber denier as high as 6 were also produced and hot calendered bonded. As anticipated, a web made with a heavy denier fiber (6 denier) was bulky, open and had good wet adhesion; however, the coverage was poor and the finished surface was rough.

TABLE 1

| Example | Liner Material | Basis Weight (BW) oz/yd$^2$ | Thickness (t) mils | Bulk t/BW*denier | Percent Void % | Mean Flow Pore Pressure psi | Mean Flow Pore Diameter microns | Wet Adhesion | Complete seepage Of gypsum slurry | Paper-like Smooth surface |
|---|---|---|---|---|---|---|---|---|---|---|
| 1 | Ahlstrom 3701 | 2.3 | 4.1 | 1.84 | 45.75 | 0.58 | 14.85 | Poor | No | Yes |
| 2 | Cerex ® 3030 PBN-II | 3 | 14.5 | 4.71 | 78.76 | 0.16 | 52.60 | Good | No | Embossed, rough |
| 3 | Cerex ® 23280 | 2.8 | 7.5 | 2.61 | 61.67 | 0.25 | 32.99 | Poor | No | Yes |
| 4 | liner per U.S. Pat. No. 5,885,909 | 2.79 | 9.3 | 3.10 | 67.76 | 0.38 | 22.26 | Okay–poor | No | Yes |
| 5 | liner per U.S. Pat. No. 5,885,909 | 2.67 | 9.6 | 3.35 | 70.11 | 0.33 | 25.53 | Poor | No | Yes |
| 6 | liner per U.S. Pat. No. 5,885,909 | 2.61 | 7.4 | 2.64 | 62.10 | 0.47 | 17.91 | Poor | No | Yes |
| 7 | Resin bonded | 2.1 | 13.3 | 6.09 | 83.59 | 0.14 | 61.71 | Very good | Yes | Smooth-slightly rough |
| 8 | Sontara ® 8007 | 3.1 | 17.9 | 5.97 | 83.25 | 0.18 | 44.61 | Very good | No | Rough |
| PGI sheet material | PGI A2-064B (standard) | 2.9 | 14 | 4.98 | 79.94 | 0.28 | 30.45 | Very good | No | Close to paper-like on rough side |
| PGI calendered sheet material | PGI A2-064B (calendered) | 3 | 9.5 | 3.27 | 69.41 | 0.36 | 23.10 | Good | No | Close to paper-like |
| 9 | PGI A2-064B (calendered) | 3.3 | 8.5 | 2.66 | 62.39 | 0.49 | 16.87 | Good | No | Yes |
| 9A | PGI A2-064B (calendered) | 3.1 | 6.8 | 2.26 | 55.84 | 0.51 | 16.52 | Okay–poor | No | Yes |
| 10 | PGI A2-070A (calendered) | 3.64 | 7.9 | 2.24 | 55.37 | 0.78 | 10.75 | Okay–poor | No | Yes |
| Liner used in Canadian Pat. No. 1,189,434 | Tyvek ® 1085D | 3.2 | 10.3 | 2.27 | 55.89 | 4.45 | 1.90 | Poor | No | No (shiny, smooth plastic film-like) |

TABLE 2

| | | | | Machine Direction (MD) Strip Tensile Properties | | | | Cross Direction (CD) Strip Tensile Properties | | | | MD + CD |
|---|---|---|---|---|---|---|---|---|---|---|---|---|
| Example | Liner Material | BW oz/yd$^2$ | Thickness mils | Strip tensile strength lbs/in | Elongation at 1 lb % | Elongation at 3 lbs % | Elongation % | Strip tensile strength lbs/in | Elongation at 1 lb % | Elongation at 3 lbs % | Elongation % | Strip Tensile per BW lbs/in/oz/yd$^2$ |
| | Paper | 6.15 | 11.9 | 58 | 0 | 0 | 1.45 | 23.74 | 0.442 | 0.666 | 3.33 | 13.29 |
| 2 | Cerex ® 3030 PBN-11 | 3 | 13.4 | 43.49 | 0.94 | 2.27 | 90.35 | 27.2 | 1.2 | 3.75 | 87.1 | 23.56 |

TABLE 2-continued

| | | | | Machine Direction (MD) Strip Tensile Properties | | | | Cross Direction (CD) Strip Tensile Properties | | | | MD + CD |
|---|---|---|---|---|---|---|---|---|---|---|---|---|
| Example | Liner Material | BW oz/yd² | Thickness mils | Strip tensile strength lbs/in | Elongation at 1 lb % | Elongation at 3 lbs % | Elongation % | Strip tensile strength lbs/in | Elongation at 1 lb % | Elongation at 3 lbs % | Elongation % | Strip Tensile per BW lbs/in/oz/yd² |
| 5 | Liner per U.S. Pat. No. 5,885,909 | 2.67 | 9.6 | 44.47 | 0.441 | 0.594 | 35.5 | 27.25 | 0.467 | 0.725 | 32.61 | 26.86 |
| 7 | Resin bonded liner | 2.1 | 13.3 | 26.64 | 0.09 | 0.47 | 14.94 | 6.75 | 0.322 | 3.44 | 30.41 | 15.90 |
| 8 | Sontara ® 8007 | 3.1 | 17.9 | 32.28 | 0.395 | 16.49 | 24.82 | 14.58 | 9.65 | 43.81 | 81.32 | 15.12 |
| PGI sheet material | PGI A2064B | 2.9 | 14 | 67.31 | 0.133 | 0.312 | 21.05 | 15.98 | 0.33 | 4.75 | 74.24 | 28.72 |
| PGI calendered sheet material | PGI A2064B (calendered) | 2.99 | 9.5 | 63.73 | 0.12 | 0.334 | 20.58 | 15.93 | 0.51 | 6.1 | 83.2 | 26.64 |
| 9 | PGI A2064B (calendered) | 3.32 | 8.5 | 72.67 | 0.125 | 0.293 | 20.1 | 15.97 | 0.656 | 2.596 | 82.1 | 26.70 |
| 10 | PGI A2070A (calendered) | 3.64 | 7.9 | 68.92 | 0.16 | 0.51 | 24.12 | 25.97 | 0.29 | 0.993 | 63.92 | 26.07 |
| Liner used in Canadian Pat. No. 1,189,434 | Tyvek ® 1085D | 3.2 | 10.3 | 65.7 | 0.226 | 0.415 | 21.39 | 74.82 | 0.21 | 0.391 | 23.59 | 43.91 |

Examples 11–36

(Breaking Characteristics of Various Gypsum Boards)

Examples 11–36 describe strength properties of the gypsum board made with various formulation and liner combinations. All breaking curves were generated at 70° F. and 3540% RH unless otherwise indicated (as in Examples 25–32 related to 90% RH and complete soaking of gypsum board under water). In addition, all breaking curves and strength data are for MD unless otherwise noted.

Examples 11–13

The core was formulated to translate liner strength properties to the finished gypsum board strength properties. This is evident by comparing the properties of gypsum boards made with three types of Elvanol® polyvinyl alcohol, namely Elvanol® 70-06 (Example 11), 90-50 (Example 12) and 71-30 (Example 13). The gypsum slurry formulation was as follows:

600 g Stucco ($CaSO_4.1/2H_2O$), 1 g fine gypsum ($CaSO_4.2H_2O$), 130 g of 4% Elvanol® solution, 150 g of 0.5% foaming agent Cedepal® FA406 solution, 245 g of water.

The liner used in Examples 11–13 was the calendered PGI sheet material A2-064B.

The boards were made per board making process using roller coating as described in the Test Methods. The board was tested for dry bond strength and breaking characteristics. The stress-strain (load-deflection) curves for the breaking of these boards are given in FIG. 1 while the numeric values are given in Table 3. The board made with Elvanol® 71-30 (Example 13) had the highest dry bond strength at 1.91 lb., the highest peak load at 68.8 lb. and the highest WTB at peak load at 85.6 lb.-in. In addition, Elvanol® 71-30 is insoluble in cold water which is required for outdoor applications and desirable for some indoor applications as well.

Examples 11–13 illustrate the potential to improve the properties of the novel board product through the selection of bonding agents that are compatible with the process and the liner. It is expected that there are several types of bonding agents that could be used in solution, as an aqueous emulsion, added as a dry ingredient to the hemihydrate used to make the slurry or applied directly to the liner surface. The polyvinyl alcohols that were used in Examples 11–13 are useful in demonstrating the concept of optimizing the formulation to improve the board properties, while maintaining a formulation that is resistant to fungal/mold growth as described in co-pending U.S. patent application Ser. Nos. 09/512,921 and 09/513,097.

As an explanation of the stress-strain curves of the gypsum board breaking, also referred to herein as the "breaking curves," the x-axis is deflection in inches and the y-axis is force in pounds.

Examples 14–15

Figure 2:
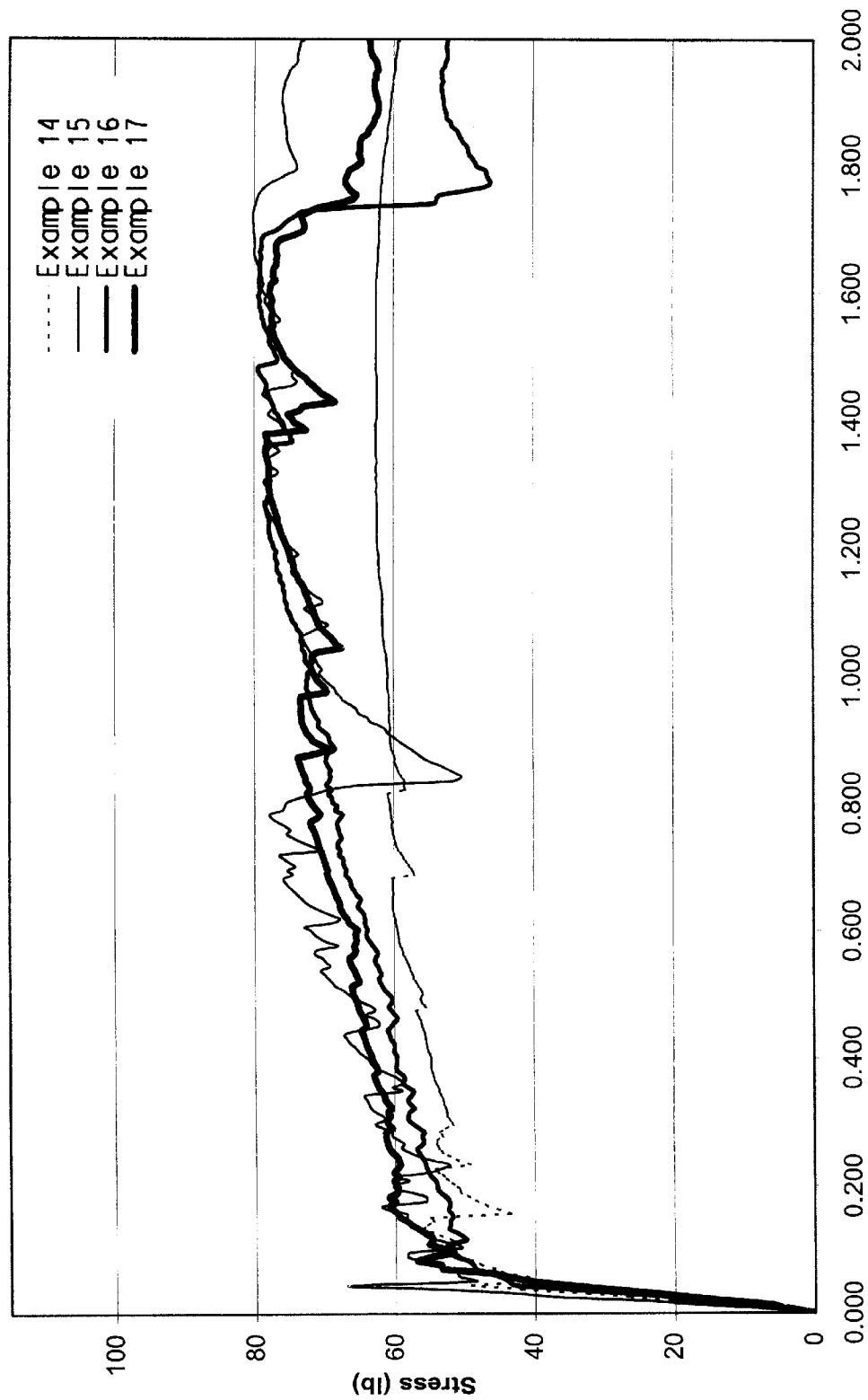

The effect of roller coating is evident from the stress-strain curves shown in FIG. 2. The gypsum slurry formulation for examples 14–15 was as follows:

600 g Stucco ($CaSO_4.1/2H_2O$), 1 g fine gypsum ($CaSO_4.2H_2O$), 2 g $K_2SO_4$, 130 g of 4% Elvanol® 90-50 solution, 370 g of water. The liner used was the PGI calendered A2-064B.

The boards were made and tested for strength according to the procedures described in the Test Methods except that no foam solution whatsoever was used. This was done to avoid any possibility of differences caused by the foaming process. The board making procedure as described in the Test Methods was followed. Example 14 was made by pouring the slurry directly into the mold, whereas for Example 15, a small amount was poured onto the surface of the liner and a trowel used to spread this layer over the inside surface of the liner before the remaining slurry was poured into the mold. There was some minimal air entrainment in the blender but the samples were of higher weight than when foam was premixed and added to the hemihydrate slurry.

As shown in FIG. 2 and Table 3, the sample (Example 15) which had roller coating had a peak load of 80.2 lb. vs. a peak load of 62.6 lb. for the comparison sample made without roller coating (Example 14). The WTB at peak load of the roller coated sample was 117.6 lb.-in. vs. 79.2 lb.-in. for the sample without roller coating. As shown in these examples, roller coating not only provides needed hardness at the edges and surface, it also improves the interaction between the liner and the gypsum core thereby increasing the breaking strength.

As described above in the Test Methods there are several techniques possible to give the dense layer at the interface, including several techniques to produce a denser slurry for application to the inside liner surface or other techniques to promote a denser layer at the interface between core and liner. As described in the procedure to make a roller coated board it is possible to use a denser slurry directly to coat the slurry side surface of the liner with a denser material.

Examples 16–17

The gypsum slurry formulation for examples 16–17 was as follows:

600 g Stucco ($CaSO_4 \cdot 1/2H_2O$), 1 g fine gypsum ($CaSO_4 \cdot 2H_2O$), 1 g $K_2SO_4$, 130 g of 4% Elvanol® 90-50 solution, 245 g of water and 150 ml of a 5% solution of Cedepal® FA406 foaming agent as described in the Test Methods. The liner used was hot calendered PGI A2064B (liner described in Example 9) for examples 16–17.

It should be pointed out that the action of the coating process itself will result in an improved dry bond as shown by comparing Examples 16 and 17. In Example 16 the board sample was made by taking some of the foamed slurry and using it to roller coat the slurry side of the liner, prior to the slurry being poured into the mold to make the main body of the core. In Example 17 the procedure as described in the roller coater method of making board (see Test Methods) was used, in this case a small amount of the slurry was poured from the blender prior to adding the foam, this small quantity of slurry being used to make a coating layer. Foam was then added to the main slurry and poured on top of the coating to make the main body of the core. For Example 17 the slurry used to make the coating contains no foam and is more dense than the main body of slurry making the core; whereas the slurry used to make the coating for Example 16 is the same as that used to make the main body of the core. As shown in FIG. 2 and Table 3, the sample (Example 16) which had the roller coating made with the foamed slurry had a peak load of 79.4 lb. vs. a peak load of 78.4 lb. for the comparison sample made using roller coating with the unfoamed slurry (Example 17). The WTB at peak load of the foamed slurry roller coated sample was 96.8 lb.-in. vs. 91.4 lb.-in. for the sample with roller coating using the unfoamed slurry. There was no deterioration of dry bond in going from unfoamed slurry to a foamed slurry for the coating step.

As shown in these examples, roller coating is advantageous to the bonding, peak load and WTB of the gypsum board product, and offers improvements to the product using a range of slurry properties. The roller coating process itself can reduce the foam content of the coating layer and add to the bonding and strength properties. It is not necessary that the slurry used to make the coating layer be of higher density, only that the roller coating be performed to assist in the bonding to the gypsum core. It is expected that the overall properties of the board will be improved with the densification of the slurry at the interface by whatever means, but the slurry does not need to be dense to start with as some densification takes place during the coating process itself.

Example 18

Figure 3:
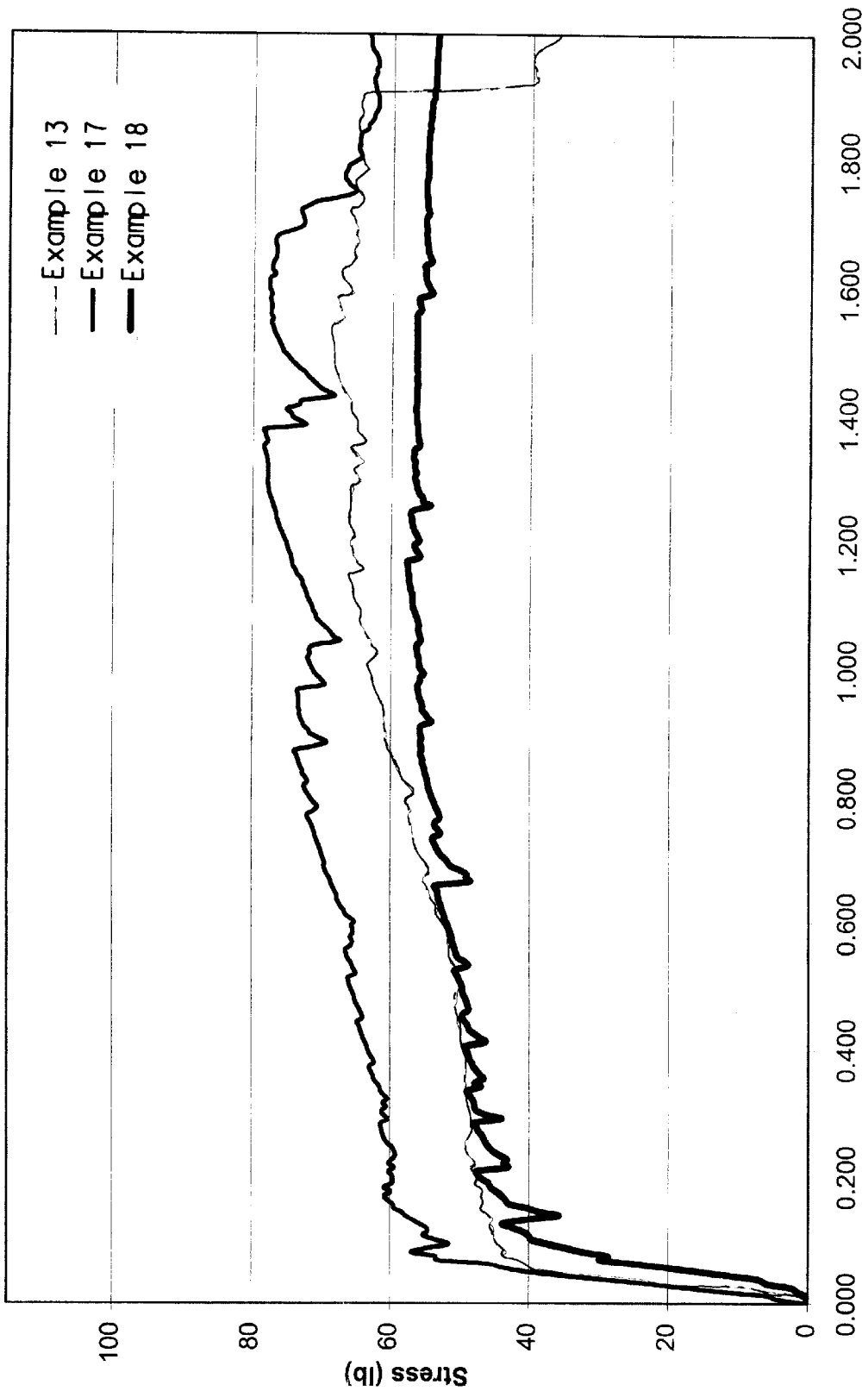

The effect of hot calendering the liner is evident by comparing the stress-strain curve for Example 17 with Example 13 in FIG. 3 and board strength data given in Table 3. The liner used in Example 18 was hot calendered PGI A2064B (liner used in Example 9). Liner used in Example 13 was PGI A2064B#3 (PGI calendered A2064B STD). The gypsum slurry formulation for the board samples in these examples was as follows: 600 g stucco ($CaSO_4 \cdot 1/2H_2O$), 1 g fine gypsum ($CaSO_4 \cdot 2H_2O$), 130 g of 4% Elvanol® solution, 150 g of 0.5% foaming agent Cedepal® FA406 solution, 245 g of water.

The boards were made per board making process using roller coat as described in the Test Methods. The boards were tested for dry bond strength and breaking characteristics.

It is evident from breaking curves and data that hot calendering enhances the bonding of fibers throughout the liner structure and hence, the liner strength is more effectively utilized during the breaking of the board, resulting in higher modulus, higher peak load and higher WTB (Example 17 vs. Example 13 in FIG. 3 and Table 3).

FIG. 3 and Table 3 also show breaking curves and data for board made with Sontara® 8100 as liner (Example 18). Since Sontara® 8100 does not have any bicomponent fibers for thermal bonding of main PET fibers based matrix, initial modulus of the board is low. The latter signifies the importance of bonding fibers needed for thermal bonding, such as hot calendering.

Example 19

Figure 4:
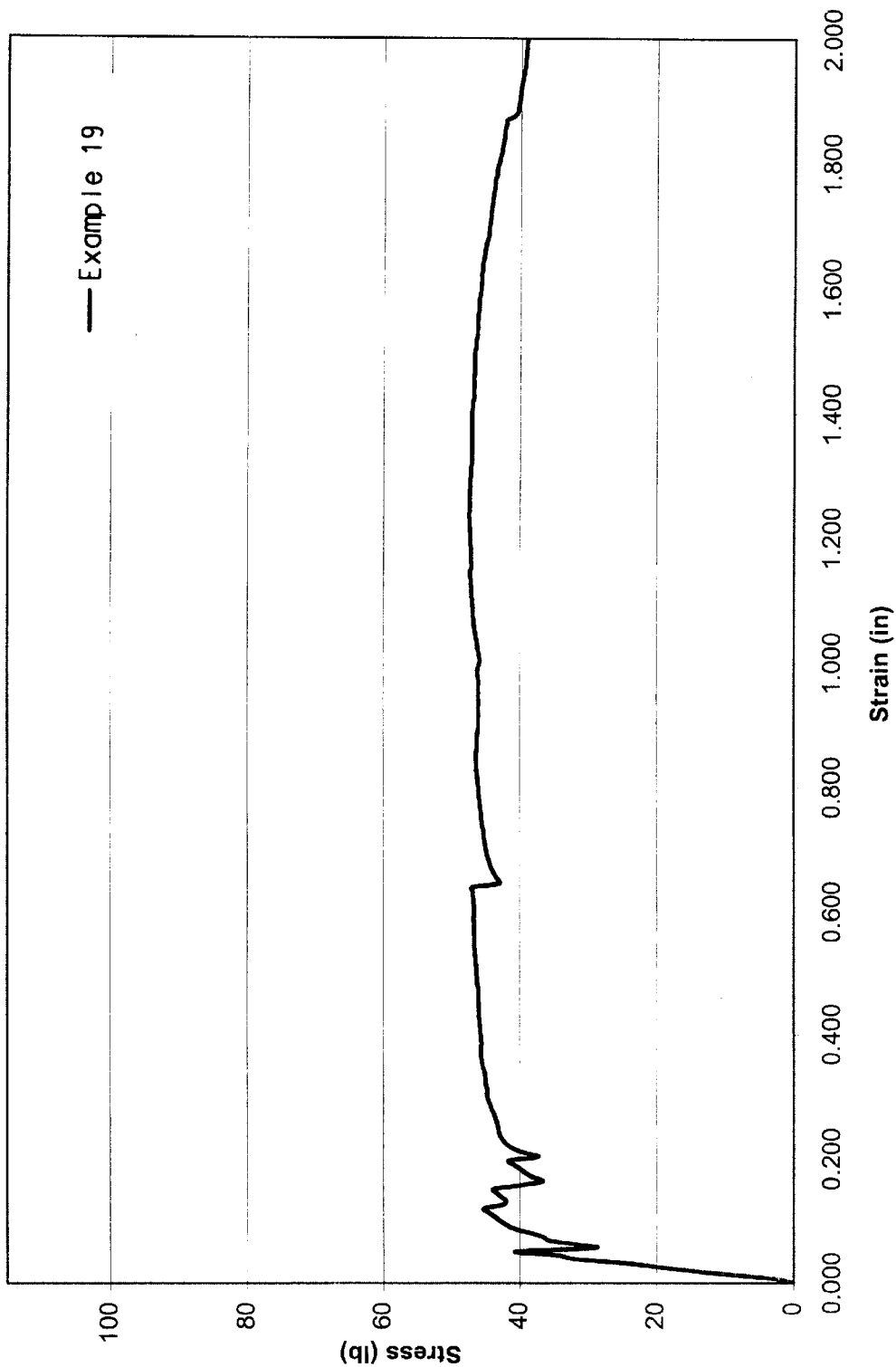

FIG. 4 shows the importance of the surface characteristics relating to the liner manufacturing process by comparing breaking characteristics of gypsum boards made with liner of Examples 5 and 9. The gypsum board of Example 19 was made by using the liner of Example 5. Although the board making and breaking methods were same for Examples 17 and 19, as shown in FIG. 4, the gypsum board of Example 19 has much lower initial modulus as compared to Example 17. The liner of Example 19 was made by the melt spinning of continuous bicomponent fibers into a nonwoven sheet and thermally bonding the sheet. Because of the predominantly two dimensional fiber arrangement of the sheet, having no hydroentanglement, needle punching, or air jet entanglement, and the low level of fiber movement due to 100% bicomponent fibers, both wet and dry adhesion (or dry bond strength) are low in spite of good pore size for the liner of Example 5.

Example 20 (Comparative) and Example 21

Figure 5:
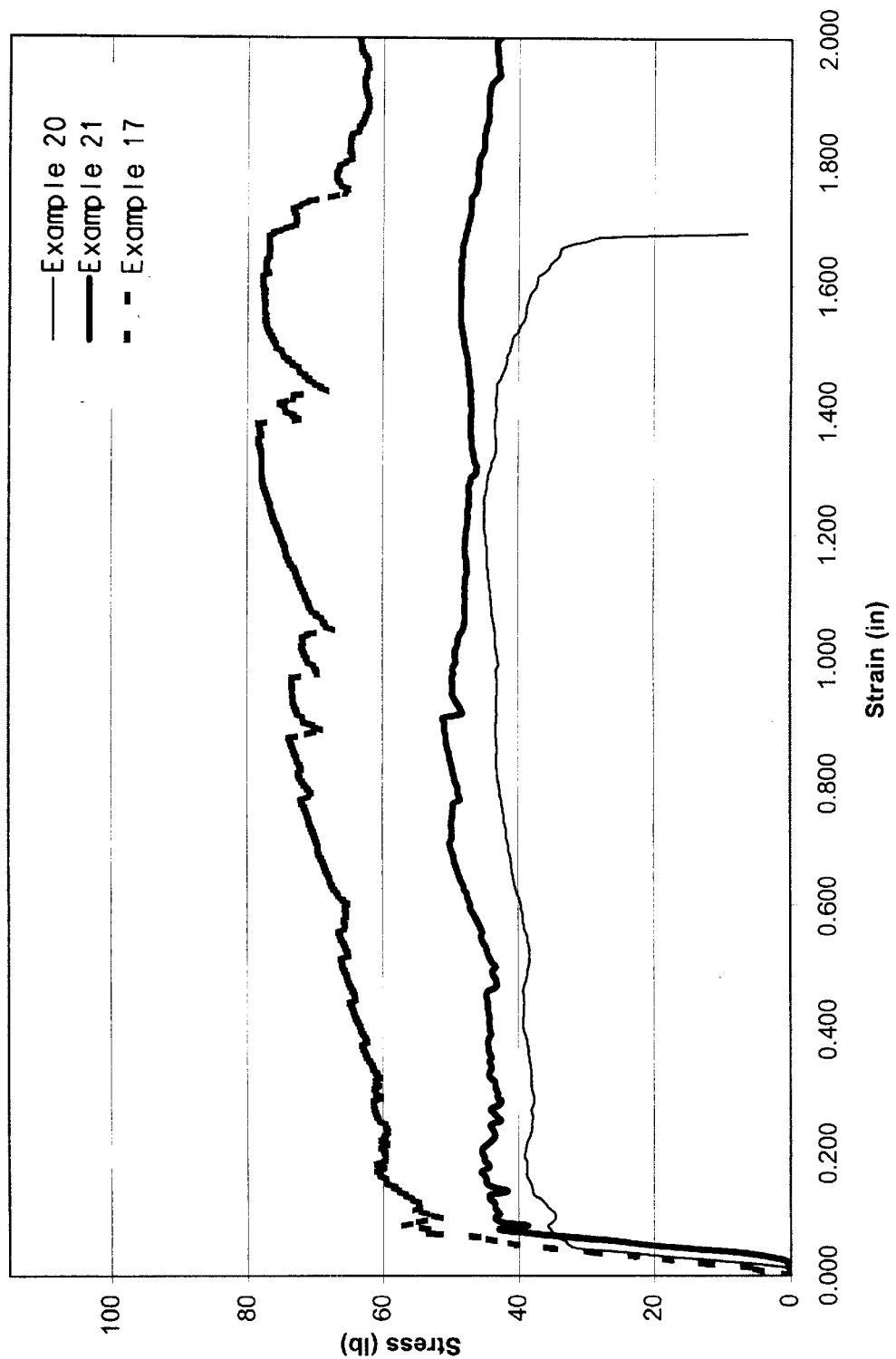

FIG. 5 illustrates the improvement over prior art, Canadian Patent No. 1,189,434. The gypsum board of Example 20 (comparative) was made according to Canadian Patent No. 1,189,434; the liner was flash-spun spun-bonded polyolefin sheet, commercially known as Tyvek® 1085D, manufactured by DuPont, and core formulation was 600 g Stucco ($CaSO_4 \cdot 1/2H_2O$), 0.433 g fine gypsum ($CaSO_4 \cdot 2H_2O$), 4.35 g of starch (Fluidex® 50 from ADM, Montreal, Canada), 1.39 g of paper pulp, 0.31 g of Disal® powder dispersant (from Handy Chemicals, Candiac, Canada), 150 g of 0.5% foaming agent Cedepal® FA406 solution, 316 g of water. Example 20 (comparative) was dried at 239° F. (116° C.) for one hour then at 103° F. (40° C.) overnight as described in Canadian Patent No. 1,189,434.

As shown in Table 2, both MD and CD strength properties of Tyvek® 1085D are equivalent to MD strength properties of paper. However, as shown in Table 3 and FIG. 5, modulus, peak load and WTB of the board made according to liner and core formulation as given in Canadian Patent No. 1,189,434 are quite low (Example 20 (comparative)).

In Example 21, the core formulation per this invention is used with Tyvek®1085D liner. Core formulation and board making procedure for Example 21 were the same as Example 17. Example 21 was dried as for Example 20 at 239° F. (116° C.) for one hour then at 103° F. (40° C.) overnight as described in Canadian Patent No. 1,189,434.

As shown in FIG. 5 as well as Table 3, there was a significant increase in modulus for Example 21 as compared to Example 20 (comparative). There was also an increase in strength properties, most likely due to a significant increase in dry bond strength in Example 21 over Example 20 (comparative).

Figure 6:
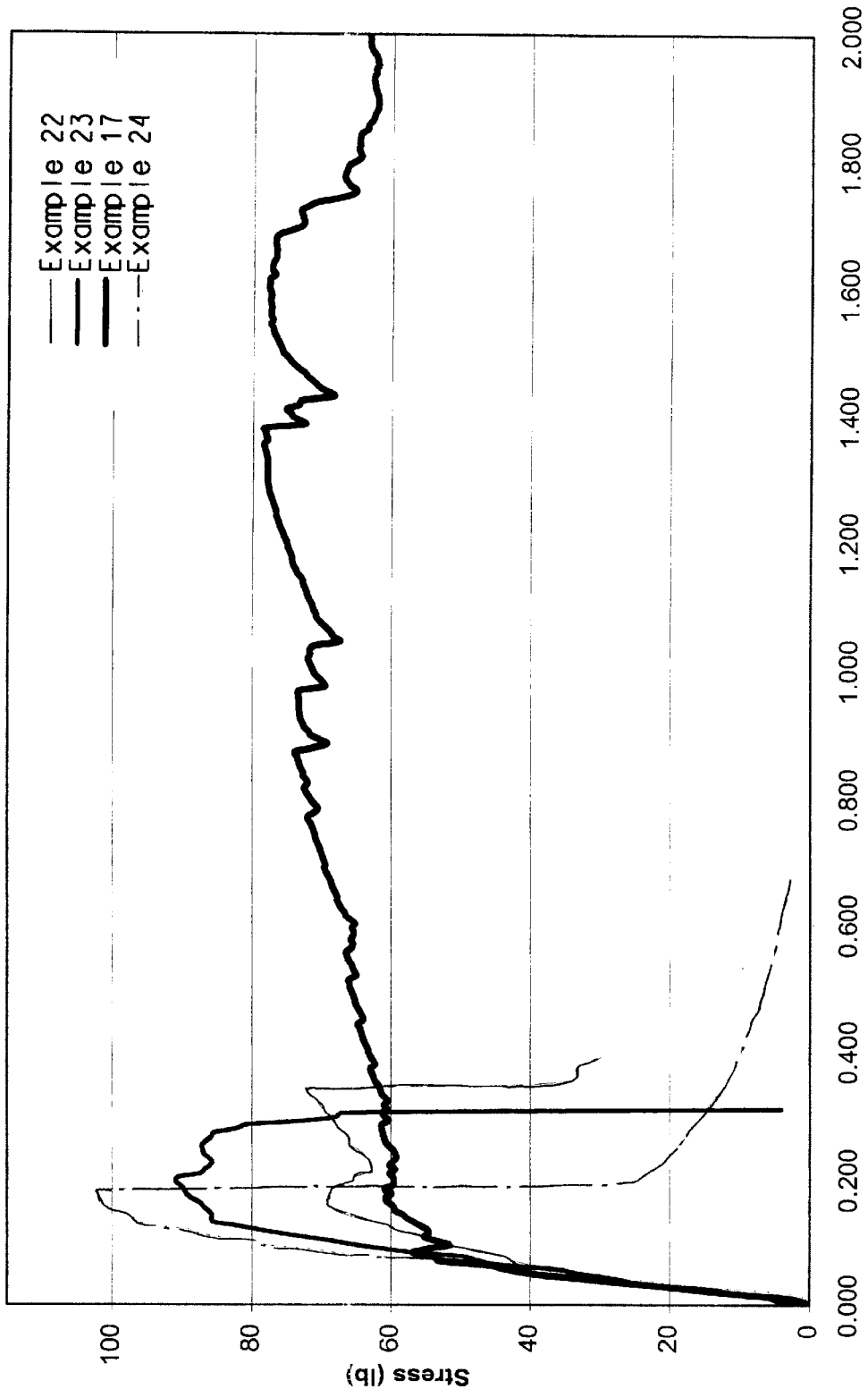

Glass® Gold exterior sheathing (available from Georgia-Pacific Corporation, Atlanta, Ga.) (Example 22 (comparative)), 0.5 in. thick, paper-lined regular gypsum board (Example 23 (comparative)) and Type X board (available from BPB Westroc, Mississauga, Canada) (Example 24 (comparative)). The breaking curves and data for these commercially available products are given in FIG. 6 and Table 3 respectively. FIG. 6 also includes breaking curves for the gypsum board per this invention (Example 17).

As shown in FIG. 6 as well as Table 3, the breaking curve for the gypsum board per this invention (Example 17) demonstrates the significantly higher dry bond (2.54 lb.) and peak WTB (91.4 lb.-in.) performance compared to these commercially available products (dry bond from 1.15 to 1.94 lb., WTB at peak load from 11.2 to 19.0 lb.-in.). The modulus and peak load of the experimental board (Example 17) at 758 lb./in. and 78.4 lb., respectively, were in the range spanned by these commercial products (modulus ranged from 428–974 lb./in. and peak load of 72.1 to 102 lb.).

TABLE 3

| Example | Dry Bond lb | Modulus lb/in | Delam. Load lb | Delam. Strain inches | Peak Load (PL) lb | Strain at Peak Load inches | Work to Break (WTB) at: | | | | | | Board weight lb/msf |
|---|---|---|---|---|---|---|---|---|---|---|---|---|---|
| | | | | | | | PL lb-in | Delam. lb-in | 0.25" lb-in | 0.5" lb-in | 0.75" lb-in | 1" lb-in | |
| Effect of Gypsum Core Formulation | | | | | | | | | | | | | |
| 11 | 1.51 | 859 | 32 | 0.045 | 52.1 | 1.045 | 45.6 | 0.8 | 8.4 | 19.0 | 30.6 | 43.2 | 1644 |
| 12 | 1.48 | 894 | 37 | 0.051 | 61.3 | 1.596 | 83.8 | 1.6 | 9.6 | 21.8 | 34.8 | 49.0 | 1735 |
| 13 | 1.91 | 931 | 43 | 0.076 | 68.8 | 1.533 | 85.6 | 1.0 | 9.8 | 22.4 | 35.6 | 50.6 | 1835 |
| Effect of Roller Coating | | | | | | | | | | | | | |
| 14 | | 1214 | 49 | 0.082 | 62.6 | 1.393 | 79.2 | 4.8 | 11.4 | 25.2 | 39.6 | 55.0 | 2328 |
| 15 | | 1631 | 67 | 0.044 | 80.2 | 1.716 | 117.6 | 7.8 | 13.0 | 28.8 | 46.6 | 63.0 | 2311 |
| 16 | 3.5 | 988 | 43 | 0.044 | 79.4 | 1.482 | 96.8 | 1.0 | 11.4 | 26.4 | 42.4 | 60.0 | 1868 |
| 17 | 2.54 | 758 | 57 | 0.038 | 78.4 | 1.381 | 91.4 | 2.0 | 12.2 | 28.2 | 44.8 | 63.0 | 1850 |
| Effect of Hot Calendering | | | | | | | | | | | | | |
| 13 | 1.91 | 931 | 43 | 0.076 | 68.8 | 1.533 | 85.6 | 1.0 | 9.8 | 22.4 | 35.6 | 50.6 | 1835 |
| 17 | 2.54 | 758 | 57 | 0.038 | 78.4 | 1.381 | 91.4 | 2.0 | 12.2 | 28.2 | 44.8 | 63.0 | 1850 |
| 18 | 8.57 | 446 | 40 | 0.108 | 57.7 | 1.172 | 56.6 | 7.8 | 8.2 | 20.2 | 33.0 | 47.0 | 1745 |
| Effect of Fiber Arrangement | | | | | | | | | | | | | |
| 19 | 0.92 | 821 | 33 | 0.044 | 47.5 | 1.235 | 0.8 | 0.8 | 8.8 | 20.2 | 31.6 | 43.2 | 1797 |
| Comparison with Competitive Products | | | | | | | | | | | | | |
| 20 (comparative) | 0.47 | 480 | 32 | 0.051 | 45 | 1.21 | 1.4 | 0.8 | 8.0 | 17.8 | 27.8 | 38.6 | 2032 |
| 21 (comparative) | 3.34 | 899 | 42 | 0.076 | 51.1 | 0.906 | 0.4 | 1.2 | 8.6 | 19.8 | 31.6 | 44.2 | 1758 |
| 22 (comparative) | 1.62 | 424 | 35 | 0.051 | 72.1 | 0.342 | 19.0 | 0.6 | 12.4 | 20.8 | 20.8 | 20.8 | 1900 |
| 23 (comparative) | 1.15 | 700 | 85 | 0.133 | 90.9 | 0.196 | 11.6 | 7.2 | 16.0 | 20.6 | 20.6 | 20.6 | 1625 |
| 17 | 2.54 | 758 | 57 | 0.038 | 78.4 | 1.381 | 91.4 | 2.0 | 12.2 | 28.2 | 44.8 | 63.0 | 1850 |
| 24 (comparative) | 1.94 | 974 | 78 | 0.095 | 102 | 0.171 | 11.2 | 3.4 | 13.4 | 16.4 | 17.0 | 17.0 | 1716 |

FIG. 5 also shows the breaking curve for Example 17 which has both improved core technology as well as liner per this invention. As shown in FIG. 5 as well as Table 3, the breaking curve has significantly shifted upward in Example 17 and the strength properties of gypsum board in Example 17 (modulus, peak load, delamination load, WTB) are significantly higher over the prior art Example 20 (comparative).

Examples 22–24 (Comparative)

Examples 22–24 are related to breaking properties of commercially available gypsum board products; Dens- Example 25 and Example 26 (Comparative)

Figure 7:
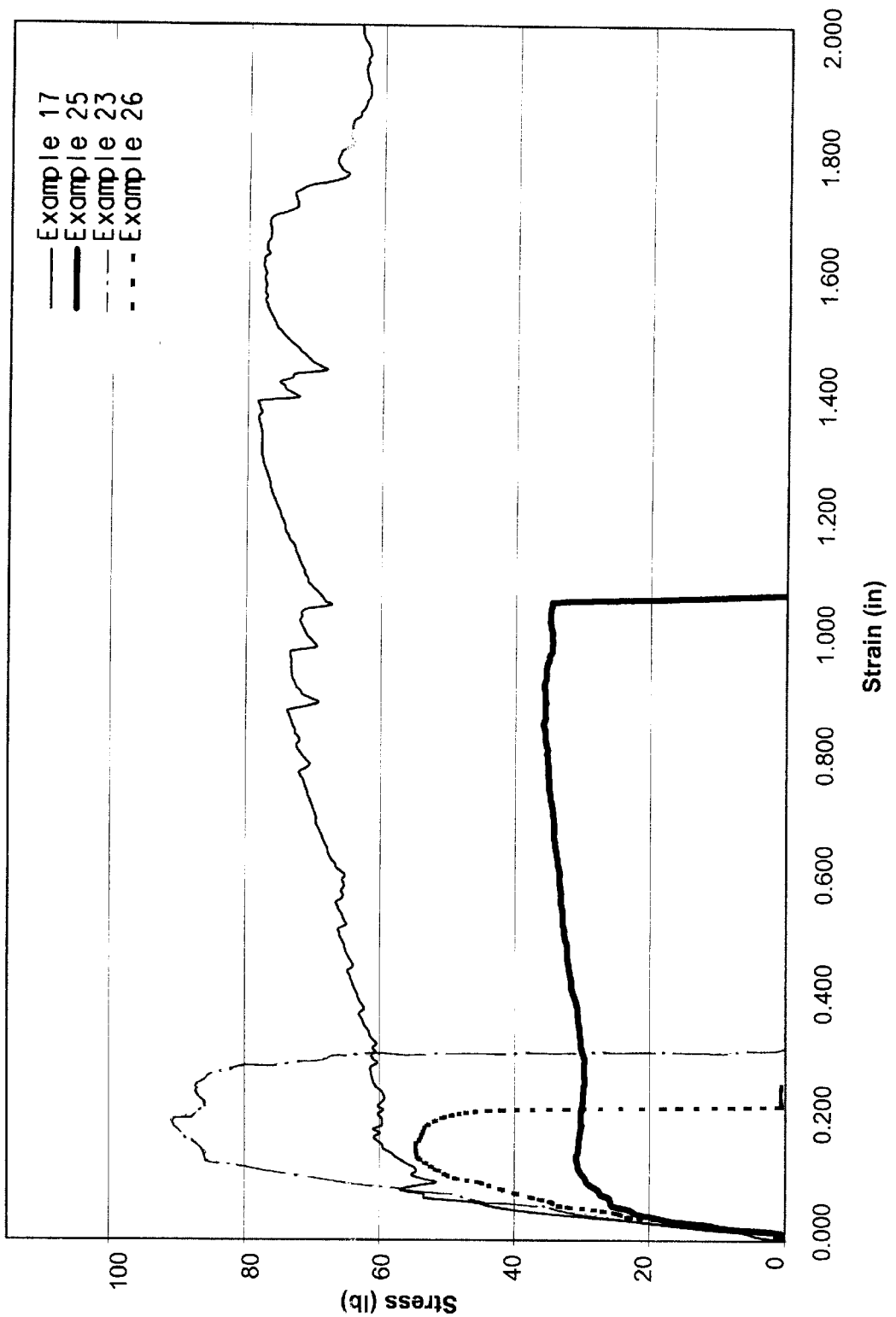

Examples 25–26 illustrate breaking strength properties of the gypsum board of the present invention compared with regular gypsum board under high humidity conditions. Example 25 illustrates the gypsum board of Example 17 exposed to 90% RH while Example 26 (comparative) illustrates standard paper-lined gypsum board of Example 23 (comparative) exposed to 90% RH. Board breaking curves and data are given in FIG. 7 and Table 4. When the dry bond was tested for the board of this invention (Example 25), the liner did not delaminate directly from the core but brought with it a fine layer of gypsum, presumably the coating layer of higher strength. The paper liner exposed to high humidity (Example 26 (comparative)) began to delaminate at the interface but then the liner began to peel through the layers of paper. The weak point in the paper liner board was obviously the interply strength of the paper at about 0.54 lb., but the nonwoven liner is internally bonded and also well bonded to the core giving dry bond strength of 1.12 lb. This is comparable to the dry bond strength of the regular paper-lined board at normal room conditions (Example 23 (comparative)). Since the core will be stronger in a production setting compared to laboratory-prepared boards of these examples, it is expected that this improvement in bonding and liner strength under high humidity will translate into further improved properties of commercially produced boards made in accordance with this invention.

The WTB figures are reduced as the liners and core pick up water at 90% RH, but the novel gypsum board remains strong with WTB figures at 1 in. strain that are better at 90% RH (31.6 lb.-in.) than the WTB figures for regular board at normal room conditions (20.6 lb.-in.) and much better than the regular board at this high humidity (9 lb.-in.).

Example 27, Example 28 (Comparative), Examples 29–30, Examples 31-32 (Comparative)

Figure 8:
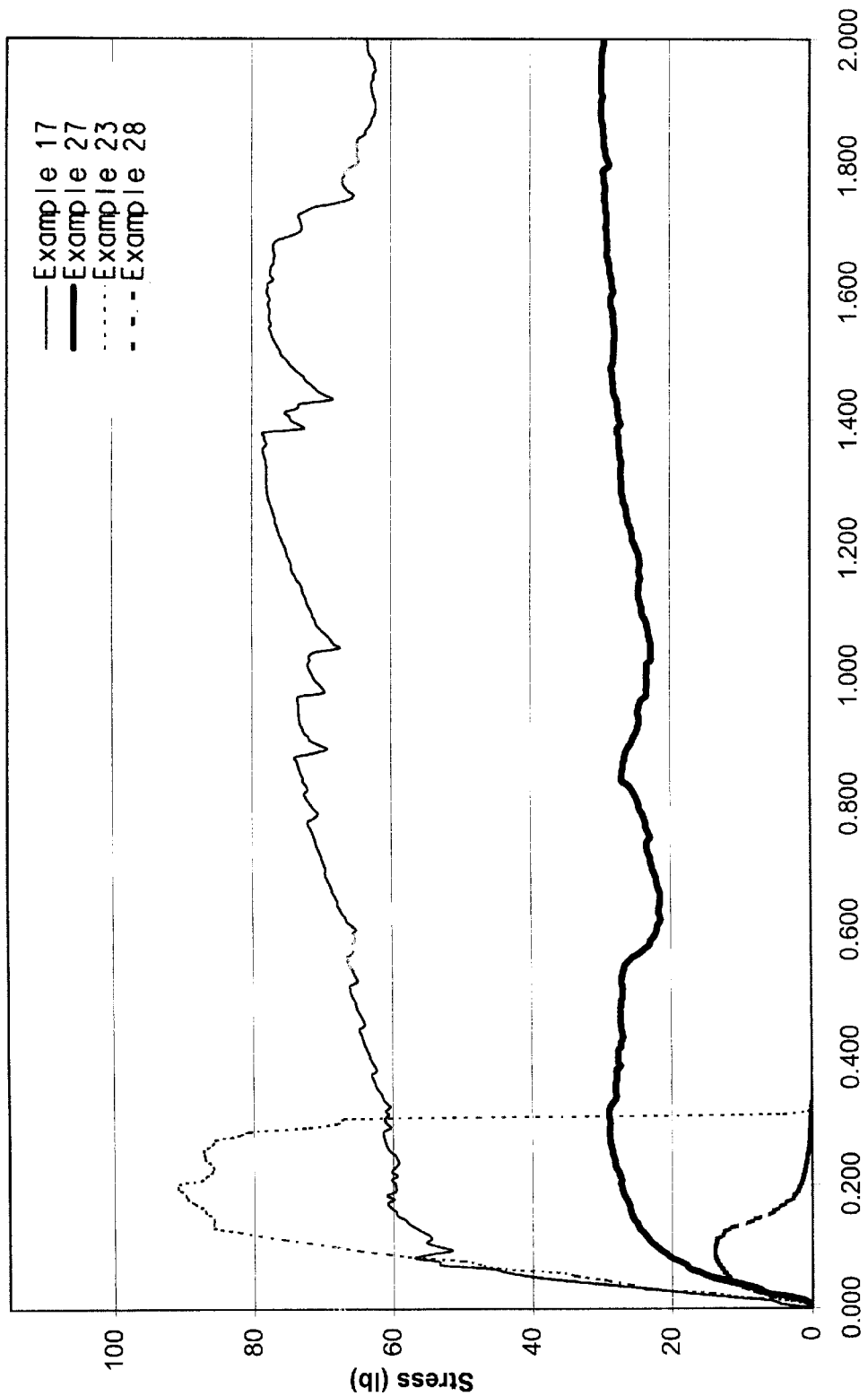

Examples 27–32 illustrate water resistant property of the gypsum board per this invention per ASTM C36. Example 27 illustrates the gypsum board of Example 17 submerged under water for 2 hours. Example 28 (comparative) illustrates standard paper-lined gypsum board submerged under water for 2 hours. The improved water resistance property for novel gypsum board is evident from FIG. 8 and Table 4. The peak load of the regular board was reduced from 90.9 lb. to 13.3 lb., a reduction of 85% whereas the novel gypsum board went from 78.4 lb. to 29.8 lb., a reduction of only 62%. The other properties of the board of the invention were also less affected by submersion in water.

In Example 29, the core was treated with water-proofing compound as follows. The core formulation used for Example 29 was modified from Example 17 to add water-proofing agent and accommodate for the impact of this agent on foam and to adjust total water content. The formulation was as follows: 600 g Stucco ($CaSO_4 \cdot 1/2H_2O$), 1 g fine gypsum ($CaSO_4 \cdot 2H_2O$), 2 g of $K_2SO_4$, 60 g of Aqualite® 72 (from Bakor Inc., Montreal Canada), 130 g of 4% Elvanol® solution, 180 g of 0.5% foaming agent Cedepal® FA406 solution and 227 g of water. The board making process for Example 29 was the same as Example 17 except for the formulation changes noted. Example 30 illustrates board of Example 29 submerged under water for 2 hours.

Example 31 (comparative) illustrates commercially available paper-lined "green" gypsum board (with water-proofed core) available from BPB Westroc. Example 32 (comparative) illustrates the board of Example 31 (comparative) submerged under water for 2 hours.

Figure 9:
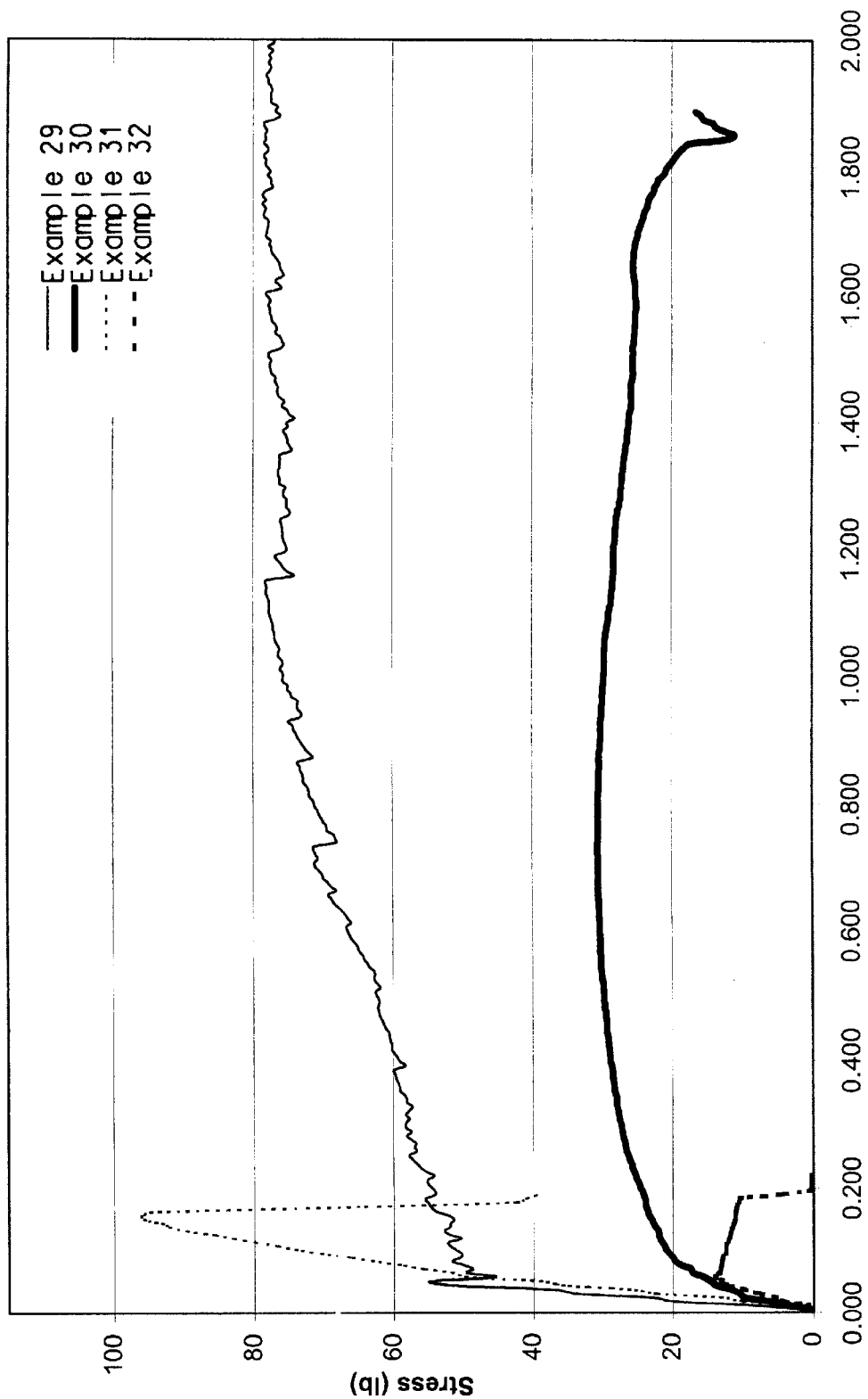

The breaking characteristics of the gypsum board were determined. The board breaking curves and data are given in FIG. 9 and Table 4. The submersion test was done in accordance with the test for water resistance as described in ASTM C36.

The degree of water-proofing was marginally higher for the commercially produced "green" board giving a weight gain after 2 hours immersion of 5.5% while the lab-produced board gave a weight gain of 6.9%. It is well known in the industry that the water-proofing of the gypsum core is more difficult to achieve in a laboratory setting since the setting times are by necessity much longer than if the board is made on a production line, so it is not surprising that the weight gain was higher for the novel core treated gypsum board. In spite of this higher weight gain, the physical properties of the novel boards were substantially improved over the conventional water resistant "green" board. The peak load figures of the commercial "green" board decreased from 96.1 to 14 lb., whereas the board of the invention only dropped from 78.6 to 30.7 lb. The bonding properties of the wet boards were also improved as the commercial "green" board peeled the liner off easily while the gypsum board of the invention still showed some bond to the core, and pulled away some of the core when the liner was forced away. This would be a marked improvement in a building structure to have the gypsum board retain greater mechanical strength and liner bonding properties if the board happens to be exposed to water for a prolonged period.

TABLE 4

| Example | Dry Bond lb | Modulus lb/in | Delam. Load lb | Delam. Strain inches | Peak Load (PL) lb | Strain at Peak Load inches | Work to Break (WTB) at: | | | | | Board weight lb/msf |
| --- | --- | --- | --- | --- | --- | --- | --- | --- | --- | --- | --- | --- |
| | | | | | | | PL lb-in | Delam. lb-in | 0.25" lb-in | 0.5" lb-in | 0.75" lb-in | 1" lb-in | |
| Humidity tolerance characteristics | | | | | | | | | | | | | |
| 17 | 2.54 | 758 | 57 | 0.038 | 78.4 | 1.381 | 91.4 | 2 | 12.2 | 28.2 | 44.8 | 63 | 1850 |
| 25 | 1.12 | 450 | 23 | 0.051 | 35.8 | 0.849 | 26.2 | 0.6 | 6.4 | 14.2 | 22.6 | 31.6 | 1733 |
| 23 (comparative) | 1.15 | 700 | 85 | 0.133 | 90.9 | 0.196 | 11.6 | 7.2 | 16 | 20.6 | 20.6 | 20.6 | 1625 |
| 26 (comparative) | 0.54 | 617 | 35 | 0.063 | 54.6 | 0.152 | 5.4 | 1.2 | 8.8 | 8.8 | 9 | 9 | 1625 |
| Water resistance characteristics | | | | | | | | | | | | | |
| 17 | 2.54 | 758 | 57 | 0.038 | 78.4 | 1.381 | 91.4 | 2 | 12.2 | 28.2 | 44.8 | 63 | 1850 |
| 27 | 0.25 | 317 | 15 | 0.051 | 29.8 | 1.881 | 48 | 0.4 | 5.2 | 12.2 | 18 | 24.2 | 1898 |
| 23 (comparative) | 1.15 | 700 | 85 | 0.133 | 90.9 | 0.196 | 11.6 | 7.2 | 16 | 20.6 | 20.6 | 20.6 | 1625 |
| 28 (comparative) | 0.16 | 206 | 8 | 0.025 | 13.9 | 0.089 | 0.8 | 0.1 | 1.8 | 1.8 | 1.8 | 1.8 | 1717 |
| 29 | 1.14 | 1276 | 54 | 0.051 | 78.6 | 1.742 | 118.6 | 1.4 | 11.8 | 26.8 | 43.4 | 61.8 | 1863 |
| 30 | 0.23 | 344 | 10 | 0.032 | 30.7 | 0.728 | 19 | 0.2 | 4.8 | 12 | 19.6 | 27.2 | 1875 |
| 31 (comparative) | 1.35 | 961 | 93 | 0.146 | 96.1 | 0.158 | 9 | 7.8 | 10.8 | 10.8 | 10.8 | 10.8 | 1600 |
| 32 (comparative) | 0.02 | 332 | 8 | 0.032 | 14 | 0.057 | 0.4 | 0.2 | 2 | 2 | 2 | 2 | 1600 |

Examples 33–34 and Example 35 (Comparative)

Example 33 illustrates the strength properties of the gypsum board of this invention with glass fibers in the core formulation. Core formulation, liner and board making process for Example 33 are the same as Example 17 except Example 33 has 3.5 g of Owens-Corning 7804 glass fibers (½ inch glass fibers available from Owens Corning, Toledo, Ohio) added to the core formulation given in Example 17. Core formulation, liner and board making procedure for Example 34 were the same as Example 29 except that 3.5 g of Owens-Corning 780-4 glass fibers (available from Owens Corning, Toledo, Ohio) were added to the core formulation of Example 29.

These laboratory-made novel gypsum boards were compared to commercially available Type X board available from BPB Westroc as described earlier in Example 24 (comparative) as well as a sample of commercially available fire resistant and abuse resistant gypsum board (Example 35 (comparative)) from CGC, a subsidiary of USG. This latter product is essentially a heavy weight, cellulosic paper-covered board with glass fibers in the core at a level that will give both abuse resistance and fire resistance properties.

Figure 10:
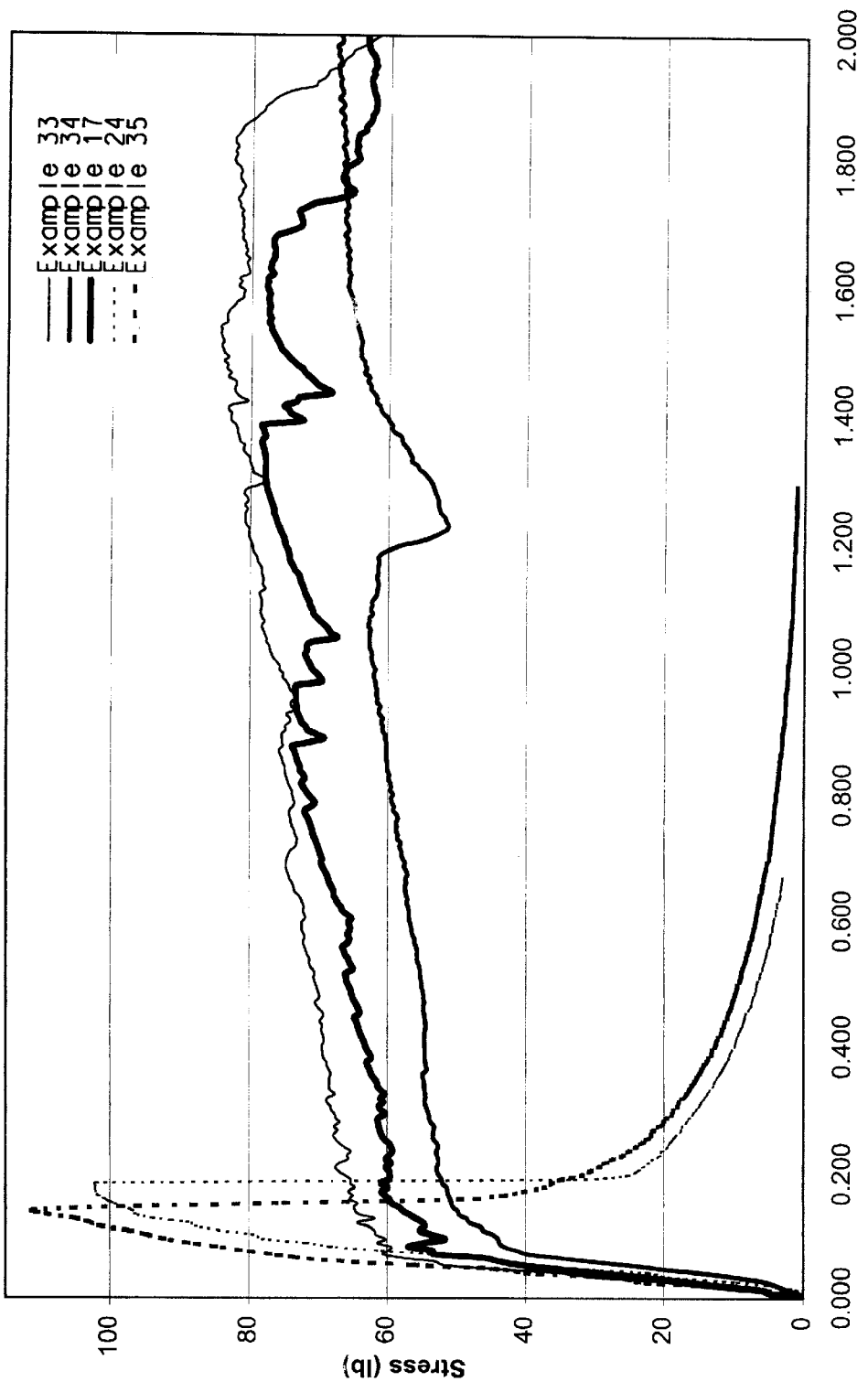

As can be seen from the board breaking curves and data are given in FIG. 10 and Table 5, the addition of glass fibers to the core improves the physical properties of the novel gypsum board product, through providing some reinforcement in the core and spreading the load in flexure across the liner. Note that in spite of the high peak loads for the commercially available boards containing glass fibers, the work to break figures measured for the novel gypsum boards were much higher. At 0.5 in. deflection, the work to break figures for the novel boards were between 23.8 and 31.2 lb.-in. while the commercial Type X boards were only 16.4–17.4 lb.-in. At higher strain values the difference is even more pronounced. Even the very high weight and glass fiber content of the fire resistant, abuse resistant board (Example 35 (comparative)) could not match the WTB performance of the novel gypsum boards, with glass fiber or without.

In addition to the improved strength properties due to the glass fibers, gypsum board per Examples 33 and 34 can have improved fire resistant properties as well. The addition of glass fibers will improve the fire resistance and reaction to fire properties and add to the improvement achieved through reducing the calorific content of the boards through reduced liner weights.

Because of the water proofing agent in the core formulation in Example 34, gypsum board per Example 34 can be used in exterior applications or even interior applications where direct exposure to water is likely.

Example 36

Example 36 illustrates the MD and CD strength of the board with the liner of Example 10. The gypsum slurry formulation and board making process for Example 36 was the same as Example 17. As explained in Examples 9 and 10, the liner of Example 10 had more fibers in the CD and had slightly higher basis weight in order to increase the liner strength in the CD without losing strength in the machine strength as compared to the liner of Example 9. The liner of Example 9 was used in making board of Example 17 and the liner of Example 10 was used in making board of Example 36.

Figure 11:
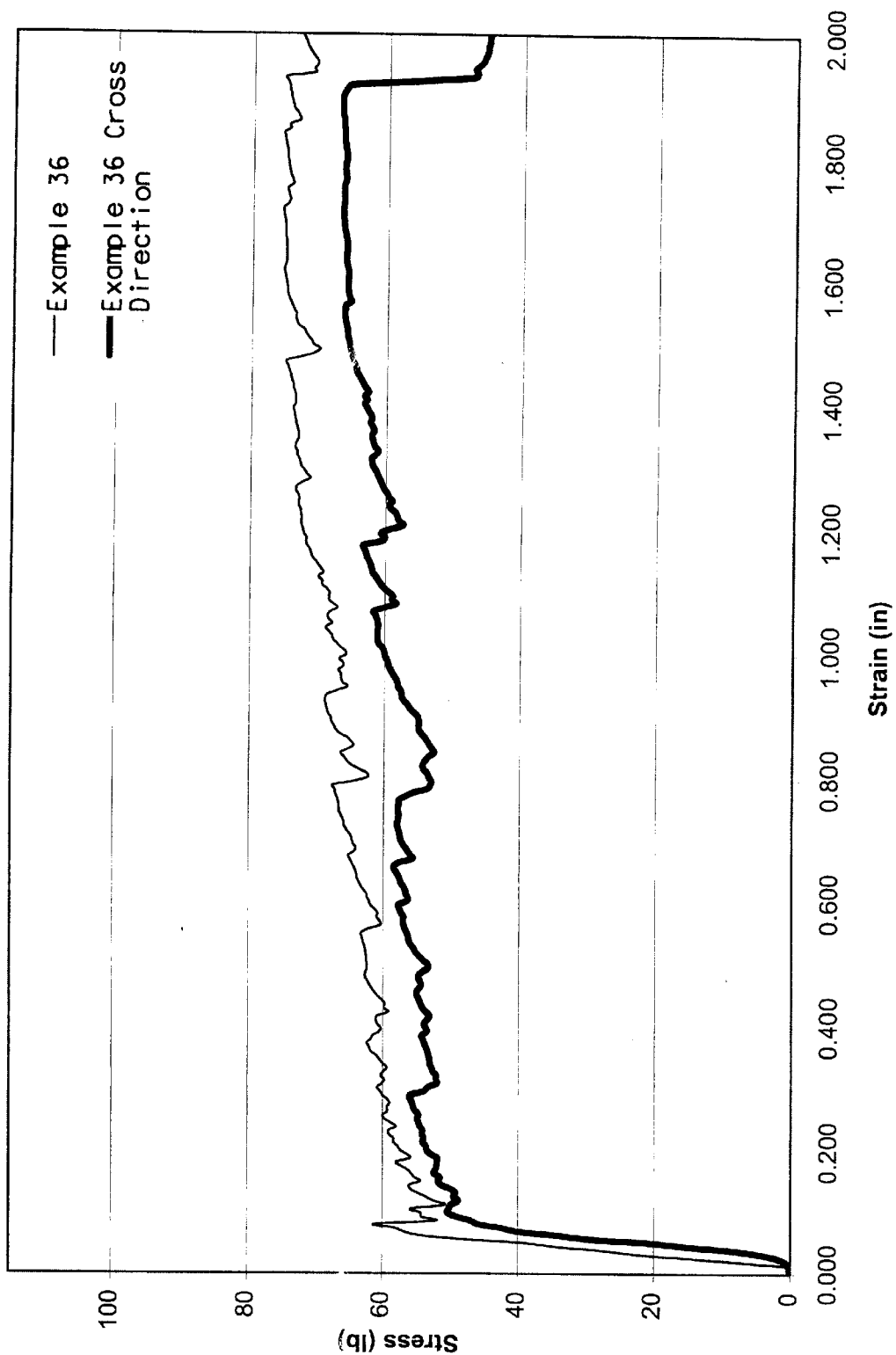

Breaking curves and data for MD and CD board directionality for gypsum board of Example 36 are given in FIG. 11 and Table 6. The novel observation here is the MD/CD board strength ratio is almost 1:1 even though the MD/CD liner strength ratio is almost 3:1 for the liner used to make the board of Example 36.

Figure 12:
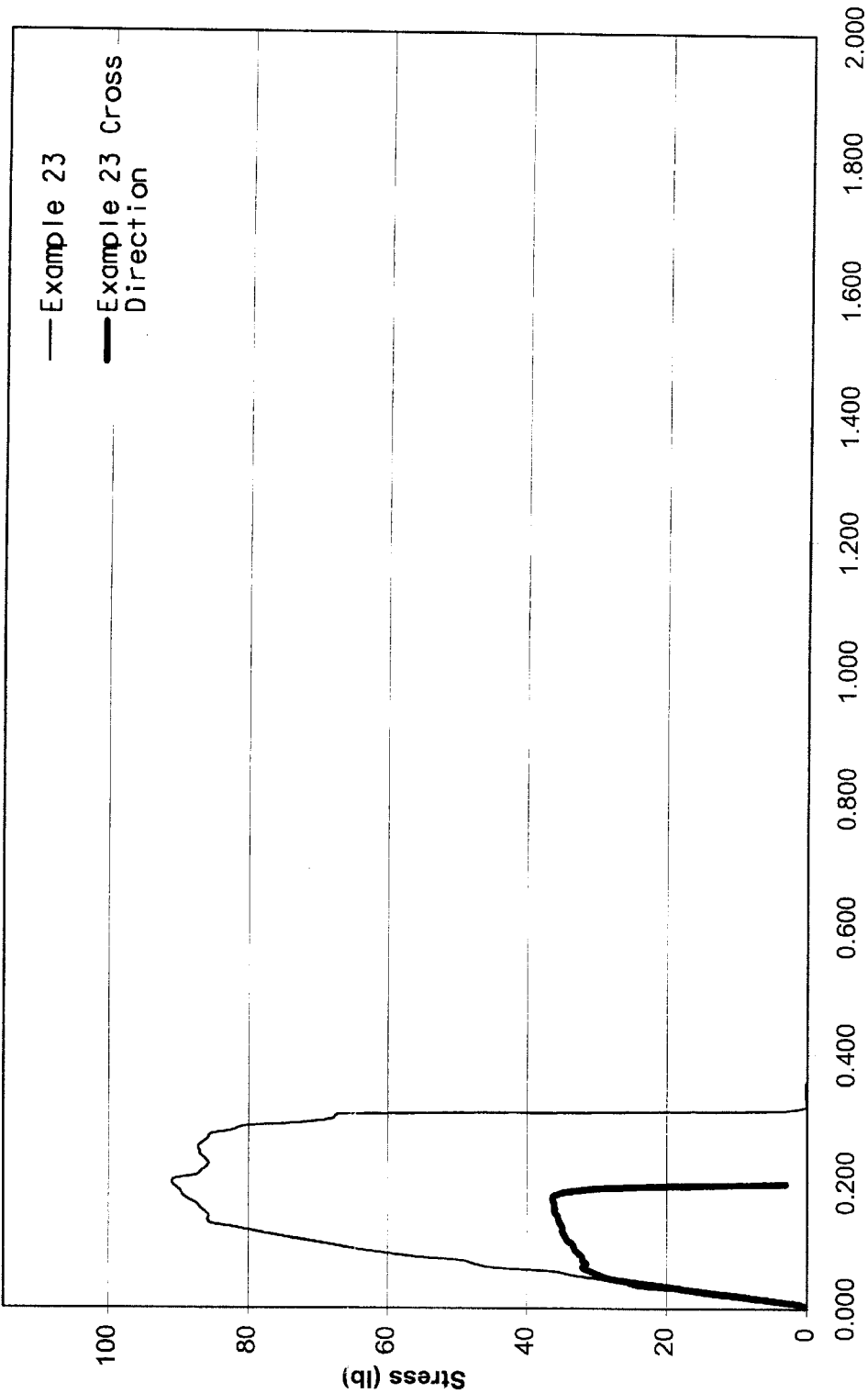

MD and CD breaking strength curves for regular paper-lined gypsum board (Example 23 (comparative)) are given in FIG. 12 and Table 6. As shown in FIG. 12 as well as in Table 6, the MD/CD board strength ratio for regular paper-lined gypsum board (Example 23 (comparative)) is almost same as the MD/CD strength ratio of paper which is about 3:1. However, as said above, in the case of gypsum board of Example 36 per this invention, the MD/CD board strength ratio is about 1:1 even though the MD/CD strength ratio of the liner used in making the gypsum board is about 3:1.

Figure 13:
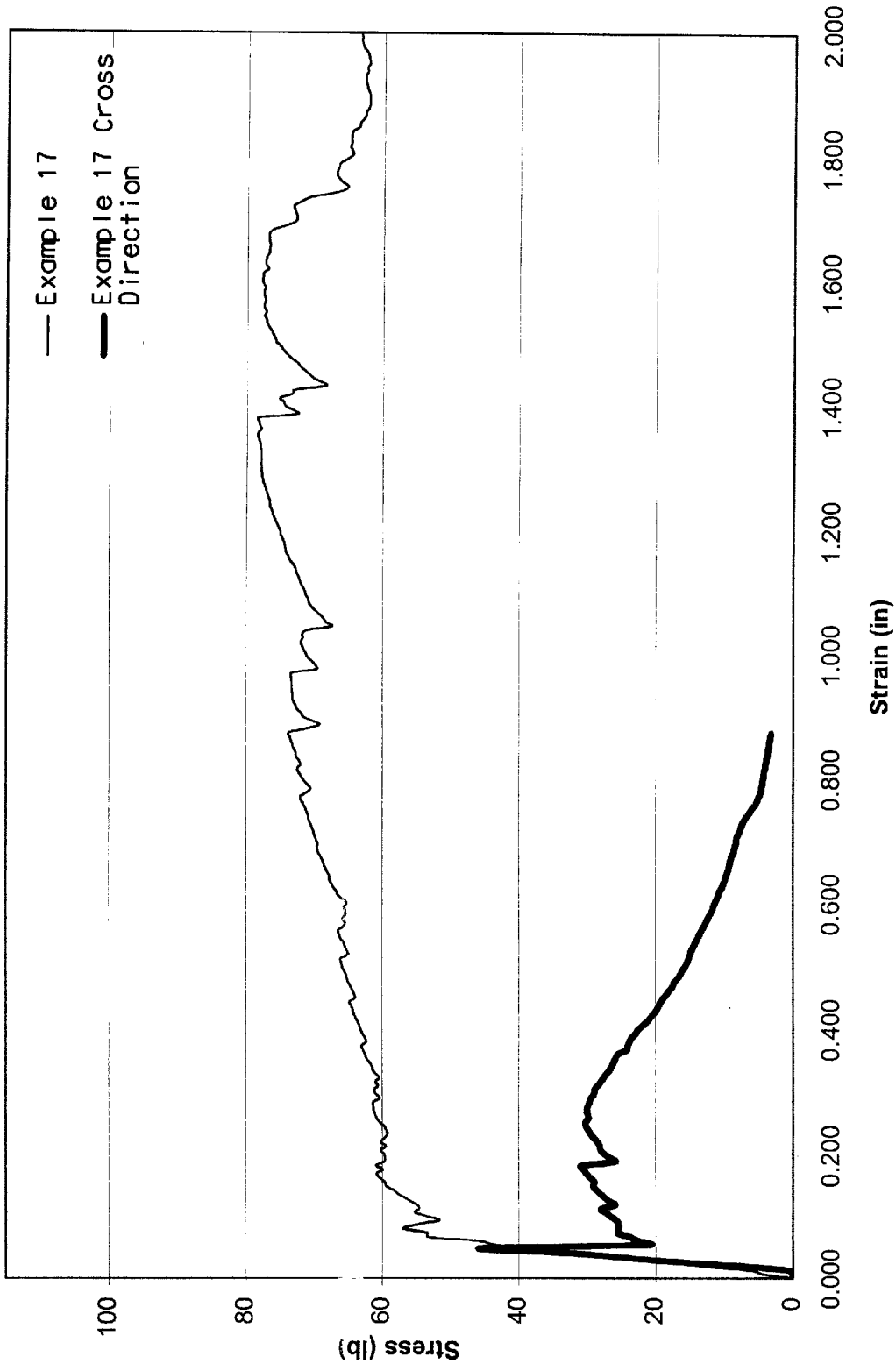

It is hypothesized that the relatively much longer fibers used in making the nonwoven liner as compared to very short fibers used in making cellulosic paper liner, there is a more pronounced interaction of MD fibers with CD fibers in the liner while breaking the gypsum board in CD which results in a higher CD strength than what one would anticipate based on the MD/CD liner strength ratio. For this MD/CD fibers interaction to be more pronounced, it appears that some minimum level of fibers is needed in the CD with respect to MD in the liner (CD/MD fiber ratio as predicted by CD/MD strip tensile ratio above 0.20 in the liner). The later is evident by the MD/CD board strength ratio for the gypsum board of Example 17 as shown in FIG. 13 and Table 6.

It is also important to note that the novel gypsum boards as demonstrated by both Examples 17 and 36 show much higher flexural strengths in the CD at 45.5 and 66.9 lb. respectively than the regular gypsum board product (Example 23 (comparative)) at 36.3 lb. Gypsum board products made with cellulosic paper liners have a strong

TABLE 5

| Example | Dry Bond lb | Modulus lb/in | Delam. Load lb | Delam. Strain inches | Peak Load (PL) lb | Strain at Peak Load inches | Work to Break (WTB) at: | | | | | | Board weight lb/msf |
|---|---|---|---|---|---|---|---|---|---|---|---|---|---|
| | | | | | | | PL lb-in | Delam. lb-in | 0.25" lb-in | 0.5" lb-in | 0.75" lb-in | 1" lb-in | |
| Gypsum board with core containing glass fibers | | | | | | | | | | | | | |
| 33 | 3.36 | 1117 | 53 | 0.057 | 84.4 | 1.526 | 110.2 | 1.6 | 13.8 | 31.2 | 49.2 | 68 | 1908 |
| 34 | 2.51 | 789 | 70 | 0.07 | 66.9 | 1.799 | 101.6 | 1.2 | 10 | 23.8 | 37.8 | 53.2 | 1794 |
| 17 | 2.54 | 758 | 57 | 0.038 | 78.4 | 1.381 | 91.4 | 2 | 12.2 | 28.2 | 44.8 | 63 | 1850 |
| 24 (comparative) | 1.94 | 974 | 78 | 0.095 | 102 | 0.171 | 11.2 | 3.4 | 13.4 | 16.4 | 17 | 17 | 1716 |
| 35 (comparative) | | 1314 | 72 | 0.063 | 111 | 0.139 | 18.8 | 2.2 | 13.6 | 17.4 | 19 | 19.8 | 2340 |

MD, and a weak CD. This impacts how the board must be used in construction, sometimes requiring that the board be installed across the support members to ensure adequate strength in use. A more "square" gypsum board as described in this invention would be advantageous by avoiding any structural weaknesses caused by the weak CD of the conventional gypsum board products.

hold up posters, etc. on the painted walls. This often results in the surface of the wall being damaged on removal of the tape since on removal the tape often takes with it not only the paint and but also the outside layers of paper as well.

Regular gypsum board from BPB Westroc, Mississauga Canada was compared to the novel board per this invention under normal room conditions, both unpainted (Example 23

TABLE 6

| Example | Dry Bond lb | Modulus lb/in | Delam. Load lb | Delam. Strain inches | Peak Load (PL) lb | Strain at Peak Load inches | Work to Break (WTB) at: PL lb-in | Delam. lb-in | 0.25" lb-in | 0.5" lb-in | 0.75" lb-in | 1" lb-in | Board weight lb/msf |
|---|---|---|---|---|---|---|---|---|---|---|---|---|---|
| 36 (MD) | 1.58 | 876 | 62 | 0.082 | 75.5 | 1.72 | 112 | 2.6 | 12.2 | 27.8 | 43.4 | 60.2 | 1909 |
| 36 (CD) | 1.86 | 857 | 50 | 0.101 | 66.9 | 1875 | 107.6 | 2.4 | 10 | 23.8 | 37.8 | 52 | 1968 |
| 23 (MD) | 1.15 | 700 | 86 | 0.0145 | 90.9 | 0.196 | 11.6 | 7.2 | 16 | 20.6 | 20.6 | 20.6 | 1625 |
| 23 (CD) | 0.85 | 309 | 30 | 0.051 | 36.3 | 0.171 | 5.6 | 0.8 | 5.6 | 5.6 | 5.6 | 5.6 | 1625 |
| 17 (MD) | 2.54 | 758 | 57 | 0.082 | 78.4 | 1.381 | 91.4 | 3 | 12.2 | 28.2 | 44.8 | 63 | 1850 |
| 17 (CD) | 2.54 | 1217 | 46 | 0.051 | 45.5 | 0.367 | 9.6 | 1 | 6.4 | 12.4 | 15 | 15.6 | 1816 |

Abrasion Resistance

Another important feature of the novel gypsum board is the abrasion resistance property. Significantly improved surface abrasion resistance of the gypsum board per this invention is evident from the surface abrasion resistance data given in Table 7. As shown in Table 7, both the loss in weight as well as reduction in thickness of the liner in Examples 9 and 10 were almost negligible while the same were significant for the cellulosic paper used in making standard gypsum board (the cellulosic paper used in the abrasion test was manufactured by Caraustar Industries, Atlanta, Ga., and had a basis weight of 6.62 g/m$^2$). The abrasion resistance of the nonwoven liners of the present invention is demonstrated by the fact that the liners lose less than 0.15 g of weight or less than 0.003 in. of thickness, when tested.

TABLE 7

| | Liner Weight | | Liner Thickness | |
|---|---|---|---|---|
| | Start (g) | End (g) | Start (in) | End (in) |
| Cellulosic Paper | 2.76 | 2.49 | 0.0131 | 0.0074 |
| | 2.81 | 2.51 | 0.0125 | 0.0068 |
| Example 9 | 1.15 | 1.15 | 0.0060 | 0.0060 |
| | 1.22 | 1.21 | 0.0065 | 0.0064 |
| Example 10 | 1.39 | 1.38 | 0.0056 | 0.0056 |
| | 1.40 | 1.39 | 0.0055 | 0.0055 |

Example 37 (Comparative) and Example 38

Another advantage of the novel gypsum board is peel strength. It has been a notorious problem with the standard paper-lined gypsum board that the paper comes off while removing wall paper or any other adhesive material attached to a painted gypsum board surface. The most common technique for removing old wall paper is to perforate the old wall paper by scoring and then wetting the perforated wall paper with water to loosen up the glue underneath the wall paper. The process results in moist paper liner and hence, the paper liner becomes very susceptible to peeling with the wall paper. Another example is the use of adhesive tape to (comparative) and Example 17, respectively) and painted (Example 37 (comparative) and Example 38, respectively). A comparison was also made of the painted boards at 90% relative humidity. As shown in Table 8, the results show that for the unpainted paper covered gypsum boards, the white surface layer of the paper came off with either Tuck Tape (available from Canadian Technical Tape Limited, Montreal Canada) or masking tape with much less bonding strength (Tartan General Purpose Masking Tape available from 3M Do-it-yourself Division, London, Ontario, Canada), leaving a rougher surface and the brown filler plies of the liner showing through. In contrast, the liner and surface of the gypsum board according to this invention stayed in place without any damage to the surface.

Similar results are obtained using painted board surfaces. The Tuck Tape adhered very strongly to the painted surface of a gypsum board made from either conventional paper liners or made as described for Example 17 (Example 37 (comparative) and Example 38, respectively). As is evidenced in Table 8, once again on removing the well adhered Tuck Tape from the board samples, the tape pulled the paint and the top layer of liner from the paper covered boards of Example 37 (comparative) when pulled from either direction. In testing the gypsum board of Example 38, the tape peeled away without damaging the surface of the board. The masking tape was less damaging to the painted paper surface peeling off paint and paper surface in many cases in the CD, but to a lesser degree in the MD of the liner. The masking tape had no effect on the painted novel gypsum board.

When the test was repeated with the board samples conditioned at 90% RH, the Tuck Tape still removed the paint and paper surface from the paper covered boards but had no effect on the painted novel board surface. With the masking tape the painted paper covered board was damaged almost every time the tape was stripped away in the CD and some of the time in the MD. Once again the masking tape had no effect on the novel board with the nonwoven liner.

TABLE 8

| | Peeling with Tuck Tape | | Peeling with Masking Tape | |
|---|---|---|---|---|
| Example | MD | CD | MD | CD |
| Unpainted boards at 70° F. and 35–40% RH | | | | |
| 23 (comparative) | White paper surface layer removed, leaving ragged surface | White paper surface layer removed, leaving ragged surface | White paper surface layer removed, leaving ragged surface | White paper surface layer removed, leaving ragged surface |
| 17 | No effect | No effect | No effect | No effect |
| Painted boards at 70° F. and 35–40% RH | | | | |
| 37 (comparative) (painted Ex. 23) | Paint and white paper surface layer removed, leaving ragged surface | White paper surface layer removed, leaving ragged surface | Small amount of paint and white paper surface layer removed, leaving ragged surface | Some paint and white paper surface layer removed, leaving ragged surface |
| 38 (painted Ex. 17) | Few very small specks of paint removed. Liner left intact. | Few very small specks of paint removed. Liner left intact. | No effect | No effect |
| Painted boards at 70° F. and 90% RH | | | | |
| 37 (comparative) (painted Ex. 23) | Paint and white paper surface layer removed, leaving ragged surface | Paint and white paper surface layer removed, leaving ragged surface | Some paint and white paper surface layer removed, leaving ragged surface | Most of paint and white paper surface layer removed, leaving ragged surface. |
| 38 (painted Ex. 17) | Few very small specks of paint removed. Liner left intact. | Few very small specks of paint removed. Liner left intact. | No effect | No effect |

Surface Smoothness

For indoor application, it is highly desired to have a surface of the gypsum board as close as possible to standard paper-lined gypsum board. The surface smoothness of various gypsum boards was assessed by measuring coefficient of friction (angle) of the liner sheet material used in making each board. The data are reported in Table 9. The lower the angle, the higher the smoothness.

TABLE 9

| | Side A | | Side B | |
|---|---|---|---|---|
| Liner material | MD angle (degrees) | CD angle (degrees) | MD angle (degrees) | CD angle (degrees) |
| Cellulosic paper | 18.5 | 21.5 | 23 | 24.5 |
| Liner of Ex. 9 | 16 | 17.5 | 18 | 20 |
| Liner of Ex. 10 | 14 | 17.5 | 15.5 | 19 |
| Liner of Ex. 5 | 10.5 | 10.5 | 11.5 | 12.5 |
| Tyvek® 1085D | 7.5 | 9 | 8.5 | 9 |

The gypsum board of the invention can also be less than 0.5 inch thick, as low as 0.125 inch thick, resulting in a more flexible board. Regardless of the thickness, the gypsum board of the present invention has a work-to-break in the MD at a strain of 0.75 inch of greater than 60*X lb-in, where X is the thickness of the board in inches.

We claim:

1. A gypsum board comprising a gypsum core held between two sheets of porous, fibrous polymeric nonwoven liner, wherein the work-to-break of the gypsum board in the MD of the nonwoven liner at a strain of 0.75 inch is greater than 30 lb-in.

2. The gypsum board of claim 1 where the two sheets of porous, fibrous, polymeric nonwoven liner form an envelope to hold the gypsum core, each of the two sheets having a first and a second edge, where the first edge of one sheet is joined to the first edge of the other sheet and the second edge of each sheet is joined to the second edge of the other sheet.

3. The gypsum board of claim 2 where an adhesive is used to join the edges of the two sheets.

4. The gypsum board of claim 1 wherein the gypsum board has a thickness of about 0.5 inch.

5. The gypsum board of claim 1 wherein the work-to-break in the CD at strain of 0.75 in is greater than 10 lb-in.

6. The gypsum board of claim 1 wherein the polymer of the polymeric nonwoven liner has a softening or melting point of at least 150° C.

7. The gypsum board of claim 1 wherein the board is free of nutrients capable of supporting fungus growth.

8. The gypsum board of claim 1 wherein the board has a MD initial modulus of at least 500 lb/in.

9. The gypsum board of claim 1 wherein the board has a MD peak load of at least 40 lb.

10. The gypsum board of claim 1 wherein the board has a MD work-to-break at peak load of at least 30 lb-in.

11. The gypsum board of claim 1 wherein the board has a MD peak load of at least 40 lb and a work-to-break at peak load of at least 30 lb-in.

12. The gypsum board of claim 1 wherein the board has a bending strain of greater than 0.5 inches at a bending stress of greater than 40 lb. without breaking the sheets.

13. The gypsum board of claim 1 wherein the board has a bending strain of greater than 1 inch at a bending stress of greater than 45 lb. without breaking the sheets.

14. The gypsum board of claim 1 wherein the board has a loss in MD flexural strength of less than 75% when flexural strength peak load is measured immediately after holding the board under water for 2 hours as per ASTM C36.

15. The gypsum board of claim 1 wherein each sheet has a strip tensile strength in the MD of at least 35 lb./in.

16. The gypsum board of claim 1 wherein each sheet has a strip tensile strength in the CD of at least 12 lb./in.

17. The gypsum board of claim 1 wherein each sheet has a percent elongation in the MD of less than 0.7% at 1 pound of force.

18. The gypsum board of claim 1 wherein each sheet has a percent elongation in the MD of less than 1.5% at 3 pounds of force.

19. The gypsum board of claim 1 wherein each sheet has a percent elongation at break in the MD of less than 100%.

20. The gypsum board of claim 1 wherein each sheet has a percent elongation in the CD of less than 3.0% at 1 pound of force.

21. The gypsum board of claim 1 wherein each sheet has a percent elongation in the CD of less than 7.0% at 3 pounds of force.

22. The gypsum board of claim 1 wherein each sheet has a percent elongation at break in the CD of less than 300%.

23. The gypsum board of claim 1 wherein each sheet has a mean flow pore diameter of 5–100 micrometers, a mean flow pore pressure of less than 3 psi and a bulk of greater than 1.25.

24. The gypsum board of claim 1 wherein each sheet has mean flow pore diameter of 10–70 micrometers, a mean flow pore pressure of less than 1 psi and bulk of greater than 2.

25. The gypsum board of claim 1 wherein at least one outside surface of one of the sheets has a surface appearance and texture similar to a conventional cellulosic paper liner and a coefficient of friction greater than 10 degrees.

26. The gypsum board of claim 1 wherein at least one sheet loses less than 0.15 grams of weight when tested for abrasion resistance.

27. The gypsum board of claim 1 wherein at least one sheet loses less than 0.003 inch of thickness when tested for abrasion resistance.

28. The gypsum board of claim 1 wherein each sheet has sufficient stiffness to render it scorable and/or foldable.

29. The gypsum board of claim 1 wherein the outside surface of each sheet has a smoother surface than the inside surface.

30. The gypsum board of claim 1 wherein at least one of the sheets has an embossed pattern thereon.

31. The gypsum board of claim 1 wherein the sheets comprise a mixture of monocomponent fibers and bicomponent fibers, wherein the bicomponent fibers comprise a sheath and a core, and wherein the softening or melting point of the sheath is sufficiently lower than the softening or melting point of the core and the softening or melting point of the monocomponent fibers.

32. The gypsum board of claim 31 wherein the sheets further comprise 15–35% by weight bicomponent fibers.

33. The gypsum board of claim 1 wherein the nonwoven liner is a composite structure consisting of nonwoven combined with woven, film, foil and/or scrim.

34. The gypsum board of claim 1 wherein the nonwoven liner further comprises an antimicrobial agent.

35. The gypsum board of claim 1 wherein the gypsum core comprises gypsum and polymeric binder.

36. The gypsum board of claim 35 wherein the gypsum core further comprises set accelerator, foaming agent, polyvinyl alcohol binder, water reducing agent, ground gypsum accelerator, potassium sulfate, set retarder, water-proofing agent, anti-burning agent, anti-microbial agent, or combinations thereof.

37. The gypsum board of claim 35 wherein the gypsum core further comprises glass fibers.

38. The gypsum board of claim 35 wherein the gypsum core further comprises a water-proofing agent and glass fibers.

39. The gypsum board of claim 1 wherein the ratio of the flexural strength peak load in the MD to the peak load in the CD is less than 3.

40. An improved gypsum board comprising a gypsum core held between two sheets of porous, fibrous polymeric nonwoven liner, wherein the work-to-break of the board in the MD at a strain of 0.75 inch is greater than 60*X lb.-in. where X is the thickness of the board in inches.

41. The gypsum board of claim 40 wherein the board has a bending strain of greater than 1 inch without breaking the sheets.

42. The gypsum board of claim 40 wherein the thickness of the board is at least 0.125 in.

43. A gypsum board comprising a gypsum core held between two sheets of porous, fibrous polymeric nonwoven liner, wherein the nonwoven liner has strip tensile in the MD of at least 35 lb./in., percent elongation at 1 lb. in the MD of less than 0.7%, percent elongation at 3 lb. in the MD of less than 1.5% and percent elongation-at-break in the MD of less than 100%, strip tensile in the CD of at least 12 lb./in., percent elongation at 1 lb. in the CD of less than 3.0%, percent elongation at 3 lb. in the CD of less than 7.0% and percent elongation-at-break in the CD of less than 300%.

44. The gypsum board of claim 43 wherein each sheet has a mean flow pore diameter of 5–100 micrometers, a mean flow pore pressure of less than 3 psi and a bulk of greater than 1.25.

45. The gypsum board of claim 43 wherein each sheet has mean flow pore diameter of 10–70 micrometers, a mean flow pore pressure of less than 1 psi and bulk of greater than 2.

46. A gypsum board comprising a gypsum core held between two sheets of porous, fibrous polymeric nonwoven liner, wherein the nonwoven liner has strip tensile in the MD of at least 65 lb./in., percent elongation at 1 lb. in the MD of less than 0.5%, percent elongation at 3 lb. in the MD of less than 0.7% and percent elongation-at-break in the MD of less than 50%, strip tensile in the CD of at least 22 lb./in., percent elongation at 1 lb. in the CD of less than 1.5%, percent elongation at 3 lb. in the CD of less than 3.0% and percent elongation-at-break in the CD of less than 100%.

47. The gypsum board of claim 46 wherein each sheet has a mean flow pore diameter of 5–100 micrometers, a mean flow pore pressure of less than 3 psi and a bulk of greater than 1.25.

48. The gypsum board of claim 47 wherein each sheet has mean flow pore diameter of 10–70 micrometers, a mean flow pore pressure of less than 1 psi and bulk of greater than 2.

* * * * *

UNITED STATES PATENT AND TRADEMARK OFFICE
CERTIFICATE OF CORRECTION

PATENT NO. : 6,800,361 B2
DATED : October 5, 2004
INVENTOR(S) : Bruce, Robert B. and Shah Ashok Harakhlal It is certified that error appears in the above-identified patent and that said Letters Patent is hereby corrected as shown below:

Title page,
Item [75], Inventors, delete "Robert B. Bruce, Burlington, CA (US);" insert
-- Robert B. Bruce, Burlington, Canada --.

Column 12,
Line 10, delete "10" and replace with -- 9 --.

Signed and Sealed this

Thirty-first Day of January, 2006

JON W. DUDAS
*Director of the United States Patent and Trademark Office*